US008776084B2

(12) United States Patent
Aho et al.

(10) Patent No.: US 8,776,084 B2
(45) Date of Patent: *Jul. 8, 2014

(54) EXECUTING AN ACCELERATOR APPLICATION PROGRAM IN A HYBRID COMPUTING ENVIRONMENT

(71) Applicant: International Business Machines Corporation, Armonk, NY (US)

(72) Inventors: Michael E. Aho, Rochester, MN (US); Gordon G. Stewart, Rochester, MN (US); Cornell G. Wright, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/780,717

(22) Filed: Feb. 28, 2013

(65) Prior Publication Data

US 2013/0179901 A1     Jul. 11, 2013

Related U.S. Application Data

(63) Continuation of application No. 12/204,842, filed on Sep. 5, 2008, now Pat. No. 8,230,442, and a continuation of application No. 13/439,479, filed on Apr. 4, 2012, now Pat. No. 8,424,018.

(51) Int. Cl.
*G06F 13/00* (2006.01)

(52) U.S. Cl.
USPC ............................. 719/313; 718/100; 712/31

(58) Field of Classification Search
CPC ........ G06F 9/445; G06F 9/4843; G06F 9/546
USPC ............................. 719/313; 718/100; 712/31
See application file for complete search history.

(56) References Cited

U.S. PATENT DOCUMENTS

| 4,989,131 | A | 1/1991 | Stone |
| 5,073,851 | A | 12/1991 | Masterson et al. |
| 5,363,484 | A | 11/1994 | Desnoyers et al. |
| 5,467,459 | A | 11/1995 | Alexander et al. |
| 5,548,761 | A | 8/1996 | Balasundaram et al. |
| 5,590,345 | A | 12/1996 | Barker et al. |
| 5,613,146 | A | 3/1997 | Gove et al. |

(Continued)

OTHER PUBLICATIONS

Office Action, U.S. Appl. No. 12/204,842, mail date Feb. 3, 2012.

(Continued)

*Primary Examiner* — Andy Ho
(74) *Attorney, Agent, or Firm* — Biggers Kennedy Lenart Spraggins, LLP; James R. Nock

(57) ABSTRACT

Executing an accelerator application program in a hybrid computing environment with a host computer having a host computer architecture; an accelerator having an accelerator architecture, the accelerator architecture optimized, with respect to the host computer architecture, for speed of execution of a particular class of computing functions; the host computer and the accelerator adapted to one another for data communications by a system level message passing module, where executing an accelerator application program on an accelerator includes receiving, from a host application program on the host computer, operating information for an accelerator application program; designating a directory as a CWD for the accelerator application program, separate from any other CWDs of any other applications running on the accelerator; assigning, to the CWD, a name that is unique with respect to names of other CWDs of other applications in the computing environment; and starting the accelerator application program on the accelerator.

24 Claims, 10 Drawing Sheets

(56) References Cited

U.S. PATENT DOCUMENTS

| | | |
|---|---|---|
| 5,835,961 A | 11/1998 | Harvey et al. |
| 5,873,127 A | 2/1999 | Harvey et al. |
| 5,983,329 A | 11/1999 | Thaler et al. |
| 6,061,773 A | 5/2000 | Harvey et al. |
| 6,070,194 A | 5/2000 | Yu et al. |
| 6,125,430 A | 9/2000 | Noel et al. |
| 6,266,745 B1 | 7/2001 | de Backer et al. |
| 6,275,857 B1 | 8/2001 | McCartney |
| 6,308,255 B1 | 10/2001 | Gorishek, IV et al. |
| 6,330,659 B1 | 12/2001 | Poff et al. |
| 6,377,979 B1 | 4/2002 | Yamashita et al. |
| 6,473,849 B1 | 10/2002 | Keller et al. |
| 6,553,411 B1 | 4/2003 | Dias et al. |
| 6,556,659 B1 | 4/2003 | Bowman-Amuah |
| 6,598,130 B2 | 7/2003 | Harris et al. |
| 6,651,132 B1 | 11/2003 | Traut |
| 6,658,522 B1 | 12/2003 | Martin et al. |
| 6,848,106 B1 | 1/2005 | Hipp |
| 6,918,070 B1 | 7/2005 | Sharma |
| 6,948,034 B2 | 9/2005 | Aoki |
| 7,383,330 B2 | 6/2008 | Moran et al. |
| 7,418,574 B2 | 8/2008 | Mathur et al. |
| 7,428,573 B2 | 9/2008 | McCanne et al. |
| 7,436,824 B2 | 10/2008 | Pepenella |
| 7,437,403 B2 | 10/2008 | Xue et al. |
| 7,469,273 B2 | 12/2008 | Anderson et al. |
| 7,478,154 B2 | 1/2009 | Cochran et al. |
| 7,631,023 B1 | 12/2009 | Kaiser et al. |
| 7,668,294 B2 | 2/2010 | Young et al. |
| 7,725,905 B1 | 5/2010 | Doshi et al. |
| 7,752,417 B2 | 7/2010 | Manczak et al. |
| 7,814,295 B2 | 10/2010 | Inglett et al. |
| 7,904,929 B1 | 3/2011 | Jaunin et al. |
| 7,984,267 B2 | 7/2011 | Aho et al. |
| 7,991,803 B2 | 8/2011 | Mercer et al. |
| 8,001,206 B2 | 8/2011 | Archer et al. |
| 8,010,718 B2 | 8/2011 | Archer et al. |
| 8,037,217 B2 | 10/2011 | Arroyo et al. |
| 8,132,106 B2 | 3/2012 | Low et al. |
| 8,141,102 B2 | 3/2012 | Aho et al. |
| 8,145,749 B2 | 3/2012 | Carey et al. |
| 8,180,972 B2 | 5/2012 | Aho et al. |
| 8,230,442 B2 | 7/2012 | Aho et al. |
| 8,255,909 B2 | 8/2012 | Carey et al. |
| 8,527,734 B2 | 9/2013 | Archer et al. |
| 2002/0029289 A1 | 3/2002 | Byrne et al. |
| 2002/0056033 A1 | 5/2002 | Huppenthal |
| 2002/0108059 A1 | 8/2002 | Canion et al. |
| 2002/0112091 A1 | 8/2002 | Schott et al. |
| 2002/0184217 A1 | 12/2002 | Bisbee et al. |
| 2003/0028751 A1 | 2/2003 | McDonald et al. |
| 2003/0061432 A1 | 3/2003 | Huppenthal et al. |
| 2003/0120723 A1 | 6/2003 | Bright et al. |
| 2003/0226018 A1 | 12/2003 | Tardo et al. |
| 2004/0221127 A1 | 11/2004 | Ang |
| 2005/0273571 A1 | 12/2005 | Lyon et al. |
| 2005/0278409 A1 | 12/2005 | Kutzik et al. |
| 2005/0278680 A1 | 12/2005 | Mukherjee et al. |
| 2006/0018341 A1 | 1/2006 | Pettey et al. |
| 2006/0085789 A1 | 4/2006 | Laborczfalvi et al. |
| 2006/0168435 A1 | 7/2006 | Svensson et al. |
| 2006/0224830 A1 | 10/2006 | Davis et al. |
| 2007/0112999 A1 | 5/2007 | Oney et al. |
| 2007/0113227 A1 | 5/2007 | Oney et al. |
| 2007/0226807 A1 | 9/2007 | Ginter et al. |
| 2007/0255802 A1 | 11/2007 | Aloni et al. |
| 2007/0294505 A1 | 12/2007 | Traut et al. |
| 2008/0028103 A1 | 1/2008 | Schlansker et al. |
| 2008/0091855 A1 | 4/2008 | Moertl et al. |
| 2008/0114937 A1 | 5/2008 | Reid et al. |
| 2008/0183882 A1 | 7/2008 | Flynn et al. |
| 2008/0222396 A1 | 9/2008 | Spracklen et al. |
| 2008/0256330 A1 | 10/2008 | Wang et al. |
| 2008/0259086 A1 | 10/2008 | Doi et al. |
| 2008/0288747 A1 | 11/2008 | Inglett et al. |
| 2009/0024734 A1 | 1/2009 | Merbach et al. |
| 2009/0080428 A1 | 3/2009 | Witkowski et al. |
| 2009/0110326 A1 | 4/2009 | Kim et al. |
| 2009/0276601 A1 | 11/2009 | Kancherla |
| 2010/0064295 A1 | 3/2010 | Aho et al. |
| 2010/0107243 A1 | 4/2010 | Moyer et al. |
| 2010/0153541 A1 | 6/2010 | Arimilli et al. |
| 2010/0191823 A1 | 7/2010 | Archer et al. |
| 2010/0191909 A1 | 7/2010 | Archer et al. |
| 2010/0191923 A1 | 7/2010 | Archer et al. |
| 2010/0192123 A1 | 7/2010 | Carey et al. |
| 2011/0191785 A1 | 8/2011 | Archer et al. |
| 2011/0225226 A1 | 9/2011 | Archer et al. |
| 2011/0225255 A1 | 9/2011 | Archer et al. |
| 2011/0225297 A1 | 9/2011 | Archer et al. |
| 2011/0238949 A1 | 9/2011 | Archer et al. |
| 2011/0239003 A1 | 9/2011 | Archer et al. |
| 2011/0267197 A1 | 11/2011 | Archer et al. |
| 2011/0271059 A1 | 11/2011 | Aho et al. |
| 2011/0271263 A1 | 11/2011 | Archer et al. |
| 2012/0192204 A1 | 7/2012 | Aho et al. |

OTHER PUBLICATIONS

Notice of Allowance, U.S. Appl. No. 12/204,842, mail date Mar. 19, 2012.
Office Action, U.S. Appl. No. 13/439,479, mail date Aug. 2, 2012.
Notice of Allowance, U.S. Appl. No. 13/439,479, mail date Nov. 26, 2012.

EXECUTING AN ACCELERATOR APPLICATION PROGRAM IN A HYBRID COMPUTING ENVIRONMENT

CROSS-REFERENCE TO RELATED APPLICATION

This application is a continuation application of and claims priority from U.S. patent application Ser. No. 12/204,842, filed on Sep. 5, 2008, now U.S. Pat. No. 8,230,442, and U.S. patent application Ser. No. 13/439,479, filed on Apr. 4, 2012, now U.S. Pat. No. 8,424,018.

BACKGROUND OF THE INVENTION

1. Field of the Invention

The field of the invention is data processing, or, more specifically, methods, apparatus, and products for executing an accelerator application program in a hybrid computing environment.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output ('I/O') devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today have advanced such that some computing environments now include core components of different architectures which operate together to complete data processing tasks. Such computing environments are described in this specification as 'hybrid' environments, denoting that such environments include host computers and accelerators having different architectures. Although hybrid computing environments are more computationally powerful and efficient in data processing than many non-hybrid computing environments, such hybrid computing environments still present substantial challenges to the science of automated computing machinery.

SUMMARY OF THE INVENTION

Methods, apparatus, and products for executing an accelerator application program on an accelerator in a hybrid computing environment, the hybrid computing environment including: a host computer having a host computer architecture; an accelerator having an accelerator architecture, the accelerator architecture optimized, with respect to the host computer architecture, for speed of execution of a particular class of computing functions; and the host computer and the accelerator adapted to one another for data communications by a system level message passing module.

Executing an accelerator application program on an accelerator in a hybrid computing environment according to embodiments of the present invention includes receiving, by the system level message passing module from a host application program on the host computer, operating information for the accelerator application program, the operating information including application execution parameters, environment variables, and a value of a substitution variable identifying a current working directory ('CWD') for the accelerator application program, with the CWD represented in the execution parameters and in the environment variables by the value of the substitution variable; designating, by the system level message passing module, a directory as a CWD for the accelerator application program, separate from any other CWDs of any other applications running on the accelerator; assigning, by the system level message passing module to the CWD, a name that is unique with respect to names of other CWDs of other applications in the computing environment; and starting, by the system level message passing module, the accelerator application program on the accelerator.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
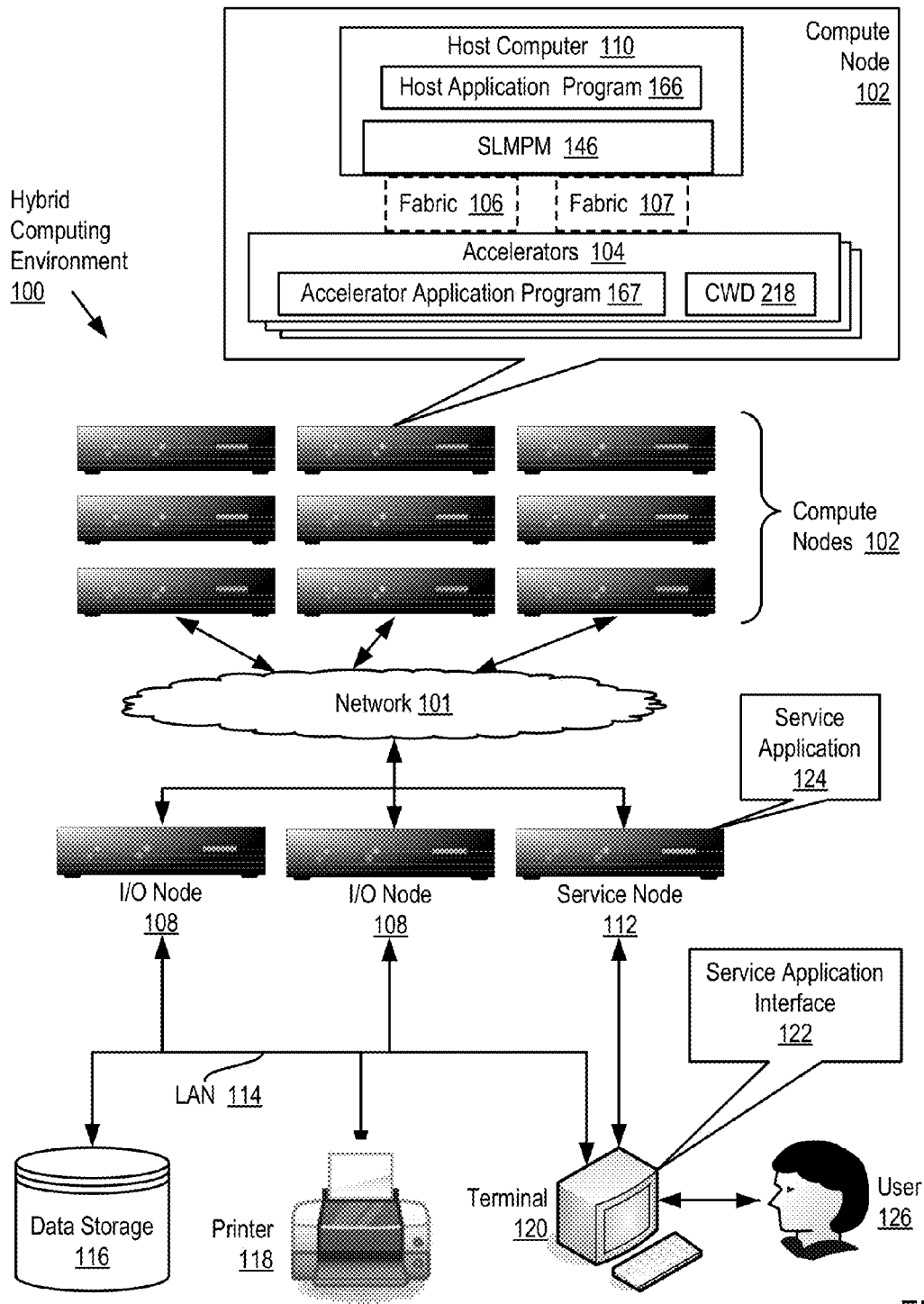
FIG. 1 sets forth a diagram of an example hybrid computing environment useful for executing an accelerator application program according to embodiments of the present invention.

Exemplary methods, apparatus, and products for executing an accelerator application program in a hybrid computing environment according to embodiments of the present invention are described with reference to the accompanying drawings, beginning with FIG. 1. FIG. 1 sets forth a diagram of an example hybrid computing environment (100) useful for executing an accelerator application program according to embodiments of the present invention. A 'hybrid computing environment,' as the term is used in this specification, is a computing environment in that it includes computer processors operatively coupled to computer memory so as to implement data processing in the form of execution of computer program instructions stored in the memory and executed on the processors. In addition, the hybrid computing environment (100) in the example of FIG. 1 includes at least one host computer having a host architecture that operates in cooperation with an accelerator having an accelerator architecture where the host architecture and accelerator architecture are different architectures. The host and accelerator architectures in this example are characterized by architectural registers, registers that are accessible by computer program instructions that execute on each architecture, registers such as, for example, an instruction register, a program counter, memory index registers, stack pointers, and the like. That is, the number, type, structure, and relations among the architectural registers of the two architectures are different, so different that computer program instructions compiled for execution on the host computer of a hybrid computing environment typically cannot be executed natively by any associated accelerator of the hybrid computing environment.

Examples of hybrid computing environments include a data processing system that in turn includes one or more host computers, each having an x86 processor, and accelerators whose architectural registers implement the PowerPC instruction set. Computer program instructions compiled for execution on the x86 processors in the host computers cannot be executed natively by the PowerPC processors in the accelerators. Readers will recognize in addition that some of the example hybrid computing environments described in this specification are based upon the Los Alamos National Laboratory ('LANL') supercomputer architecture developed in the LANL Roadrunner project (named for the state bird of New Mexico), the supercomputer architecture that famously first generated a 'petaflop,' a million billion floating point operations per second. The LANL supercomputer architecture includes many host computers with dual-core AMD Opteron processors coupled to many accelerators with IBM Cell processors, the Opteron processors and the Cell processors having different architectures.

The example hybrid computing environment (100) of FIG. 1 includes a plurality of compute nodes (102), I/O nodes (108), and a service node (112). The compute nodes (102) are coupled through network (101) for data communications with one another and with the I/O nodes (108) and the service node (112). The data communications network (101) may be implemented as an Ethernet, Internet Protocol ('IP'), PCIe, Infiniband, Fibre Channel, or other network as will occur to readers of skill in the art.

In the example hybrid computing environment (100) of FIG. 1, the compute nodes carry out principal user-level computer program execution, accepting administrative services, such as initial program loads and the like, from the service application (124) executing on the service node (112) and gaining access to data storage (116) and I/O functionality (118, 120) through the I/O nodes (108). In the example of FIG. 1, the I/O nodes (108) are connected for data communications to I/O devices (116, 118, 120) through a local area network ('LAN') (114) implemented using high-speed Ethernet or a data communications fabric of another fabric type as will occur to those of skill in the art. I/O devices in the example hybrid computing environment (100) of FIG. 1 include non-volatile memory for the computing environment in the form of data storage device (116), an output device for the hybrid computing environment in the form of printer (118), and a user (126) I/O device in the form of computer terminal (120) that executes a service application interface (122) that provides to a user an interface for configuring compute nodes in the hybrid computing environment and initiating execution by the compute nodes of principal user-level computer program instructions.

In the example of FIG. 1, each compute node includes a host computer (110) having a host computer architecture and one or more accelerators (104) having an accelerator architecture. A host computer (110) is a 'host' in the sense that it is the host computer that carries out interface functions between a compute node and other components of the hybrid computing environment external to any particular compute node. That is, it is the host computer that executes initial boot procedures, power on self tests, basic I/O functions, accepts user-level program loads from service nodes, and so on. An accelerator (104) is an 'accelerator' in that each accelerator has an accelerator architecture that is optimized, with respect to the host computer architecture, for speed of execution of a particular class of computing functions. Such accelerated computing functions include, for example, vector processing, floating point operations, and others as will occur to those of skill in the art.

Because each of the compute nodes in the example of FIG. 1 includes a host computer and an accelerator, readers of skill in the art will recognize that each compute node represents a smaller, separate hybrid computing environment within the larger hybrid computing environment (100) of FIG. 1. That is, not only may the combination of the compute nodes (102) form a hybrid computing environment (100), but it is also the case that each individual compute node may also be viewed as a separate, smaller hybrid computing environment. The hybrid computing environment (100) in the example of FIG. 1 then, may be viewed as composed of nine separate, smaller hybrid computing environments, one for each compute node, which taken together form the hybrid computing environment (100) of FIG. 1.

Within each compute node (102) of FIG. 1, a host computer (110) and one or more accelerators (104) are adapted to one another for data communications by a system level message passing module ('SLMPM') (146) and by two or more data communications fabrics (106, 107) of at least two different fabric types. An SLMPM (146) is a module or library of computer program instructions that exposes an application programming interface ('API') to user-level applications for carrying out message-based data communications between the host computer (110) and the accelerator (104). Examples of message-based data communications libraries that may be improved for use as an SLMPM according to embodiments of the present invention include:

the Message Passing Interface or 'MPI,' an industry standard interface in two versions, first presented at Supercomputing 1994, not sanctioned by any major standards body, the Data Communication and Synchronization interface ('DACS') of the LANL supercomputer, the POSIX Threads library ('Pthreads'), an IEEE standard for distributed, multithreaded processing, the Open Multi-Processing interface ('OpenMP'), an industry-sanctioned specification for parallel programming, and other libraries that will occur to those of skill in the art.

A data communications fabric (106, 107) is a configuration of data communications hardware and software that implements a data communications coupling between a host computer and an accelerator. Examples of data communications fabric types include Peripheral Component Interconnect ('PCI'), PCI express ('PCIe'), Ethernet, Infiniband, Fibre Channel, Small Computer System Interface ('SCSI'), External Serial Advanced Technology Attachment ('eSATA'), Universal Serial Bus ('USB'), and so on as will occur to those of skill in the art.

In the example hybrid computing environment (100) of FIG. 1, the SLMPM (146) may operate generally for executing an accelerator application program (167) on an accelerator (104) according to embodiments of the present invention. The SLMPM (146) in the example of FIG. 1 may operate for executing an accelerator application program (167) on an accelerator (104) in a hybrid computing environment (100) according to embodiments of the present invention by receiving, from a host application program (166) on a host computer (110), operating information for the accelerator application program (167), designating a directory as a current working directory ('CWD') (218) for the accelerator application program, assigning, to the CWD (218), a name that is unique with respect to names of other CWDs of other applications in the computing environment, and starting the accelerator application program on the accelerator. A 'current working directory' or 'CWD,' as the term is used in this specification, is a directory of a hierarchical file system, dynamically associated with a process or thread of execution. When such a process refers to a file using a simple file name or relative path, as opposed to a file name designated by a full path from a root directory, the reference is interpreted relative to the current working directory of the process. For example, a process with a CWD of '/ExampleCWD' that requests to open a file named 'foo.txt,' will effect an opening of the file '/ExampleCWD/foo.txt.'

The arrangement of compute nodes, data communications fabrics, networks, I/O devices, service nodes, I/O nodes, and so on, making up the hybrid computing environment (100) as illustrated in FIG. 1 are for explanation only, not for limitation of the present invention. Hybrid computing environments useful for executing an accelerator application program according to embodiments of the present invention may include additional nodes, networks, devices, and architectures, not shown in FIG. 1, as will occur to those of skill in the art. Although the hybrid computing environment (100) in the example of FIG. 1 includes only nine compute nodes (102), readers will note that hybrid computing environments according to embodiments of the present invention may include any number of compute nodes. The LANL supercomputer, taken as an example of a hybrid computing environment with multiple compute nodes, contains as of this writing more than 12,000 compute nodes. Networks and data communications fabrics in such hybrid computing environments may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Figure 2:
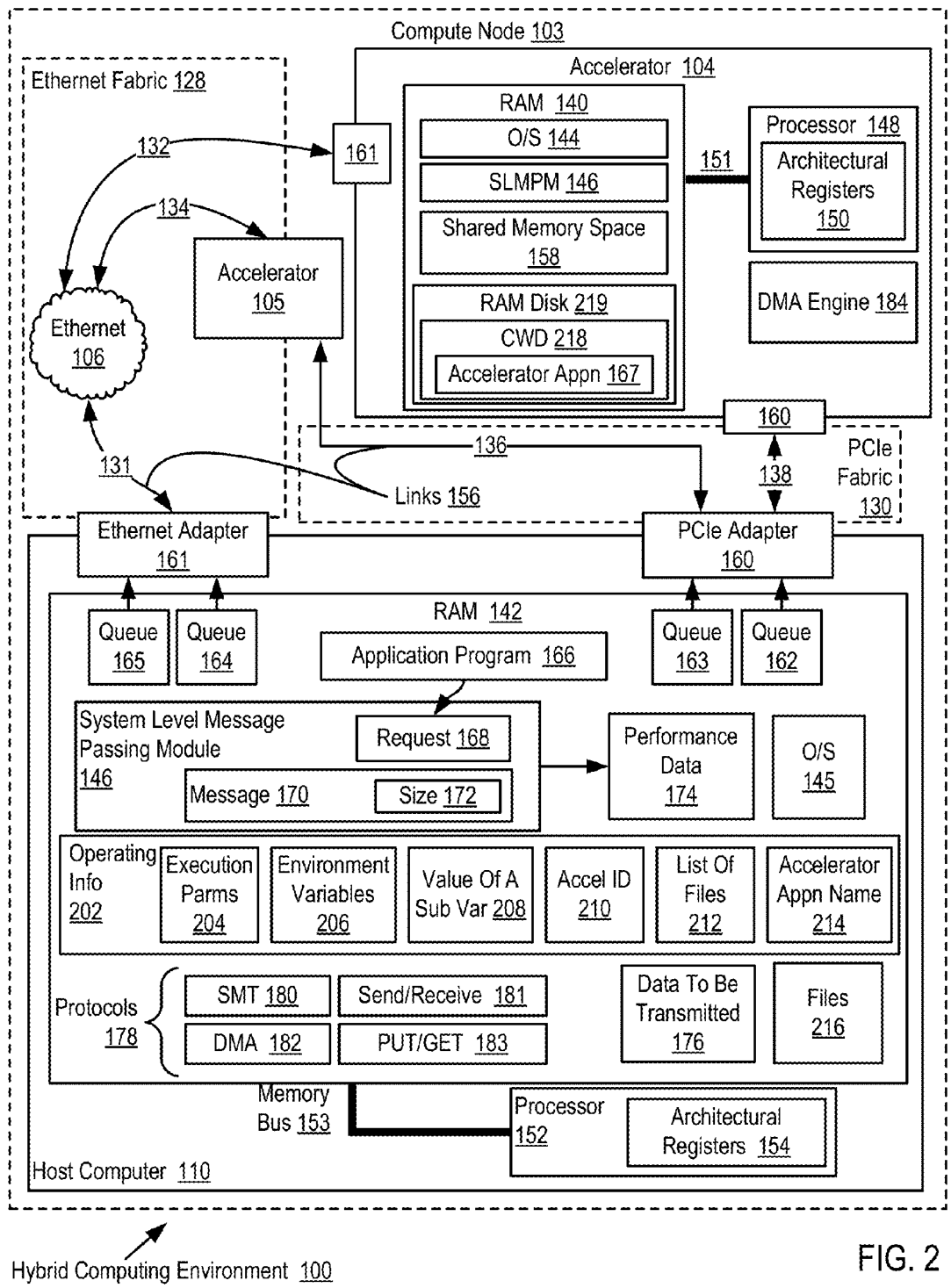
FIG. 2 sets forth a block diagram of an exemplary hybrid computing environment useful for executing an accelerator application program according to embodiments of the present invention.

For further explanation, FIG. 2 sets forth a block diagram of an exemplary hybrid computing environment (100) useful for executing an accelerator application program according to embodiments of the present invention. The hybrid computing environment (100) of FIG. 2 includes one compute node (103), similar to the compute nodes of FIG. 1, in that the compute node (103) in the example of FIG. 2 may represents a small, separate hybrid computing environment which, when taken with other similar compute nodes, together make up a larger hybrid computing environment, such as the larger hybrid computing environment illustrated in FIG. 1. The compute node (103) in the example of FIG. 2 is illustrated in an expanded view to aid a more detailed explanation of such a hybrid computing environment (100). The compute node (103) in the example of FIG. 2 includes a host computer (110). The host computer (110) includes a computer processor (152) operatively coupled to computer memory, Random Access Memory ('RAM') (142), through a high speed memory bus (153). The processor (152) in each host computer (110) has a set of architectural registers (154) that defines the host computer architecture.

The example compute node (103) of FIG. 2, also includes one or more accelerators (104, 105). Each accelerator (104, 105) includes a computer processor (148) operatively coupled to RAM (140) through a high speed memory bus (151). Stored in RAM (140,142) of the host computer and the accelerators (104, 105) is an operating system (145). Operating systems useful in host computers and accelerators of hybrid computing environments according to embodiments of the present invention include UNIX™, Linux™, Microsoft XP™, Microsoft Vista™, Microsoft NT™, AIX™, IBM's i5/OS™, and others as will occur to those of skill in the art. There is no requirement that the operating system in the host computers should be the same operating system used on the accelerators.

The processor (148) of each accelerator (104, 105) has a set of architectural registers (150) that defines the accelerator architecture. The architectural registers (150) of the processor (148) of each accelerator are different from the architectural registers (154) of the processor (152) in the host computer (110). With differing architectures, it would be uncommon, although possible, for a host computer and an accelerator to support the same instruction sets. As such, computer program instructions compiled for execution on the processor (148) of an accelerator (104) generally would not be expected to execute natively on the processor (152) of the host computer (110) and vice versa. Moreover, because of the typical differences in hardware architectures between host processors and accelerators, computer program instructions compiled for execution on the processor (152) of a host computer (110) generally would not be expected to execute natively on the processor (148) of an accelerator (104) even if the accelerator supported the instruction set of the host. The accelerator architecture in example of FIG. 2 is optimized, with respect to the host computer architecture, for speed of execution of a particular class of computing functions. That is, for the function or functions for which the accelerator is optimized, execution of those functions will proceed faster on the accelerator than if they were executed on the processor of the host computer.

In the example of FIG. 2, the host computer (110) and the accelerators (104, 105) are adapted to one another for data communications by a system level message passing module ('SLMPM') (146) and two data communications fabrics (128, 130) of at least two different fabric types. In this example, to support message-based data communications between the host computer (110) and the accelerator (104), both the host computer (110) and the accelerator (104) have an SLMPM (146) so that message-based communications can both originate and be received on both sides of any coupling for data communications. Also in the example of FIG. 2, the host computer (110) and the accelerators (104, 105) are adapted to one another for data communications by a PCIe fabric (130) through PCIe communications adapters (160)

and an Ethernet fabric (128) through Ethernet communications adapters (161). The use of PCIe and Ethernet is for explanation, not for limitation of the invention. Readers of skill in the art will immediately recognize that hybrid computing environments according to embodiments of the present invention may include fabrics of other fabric types such as, for example, PCI, Infiniband, Fibre Channel, SCSI, eSATA, USB, and so on.

The SLMPM (146) in this example operates generally for data processing in a hybrid computing environment (100) by monitoring data communications performance for a plurality of data communications modes between the host computer (110) and the accelerators (104, 105), receiving a request (168) to transmit data according to a data communications mode from the host computer to an accelerator, determining whether to transmit the data according to the requested data communications mode, and if the data is not to be transmitted according to the requested data communications mode: selecting another data communications mode and transmitting the data according to the selected data communications mode. In the example of FIG. 2, the monitored performance is illustrated as monitored performance data (174) stored by the SLMPM (146) in RAM (142) of the host computer (110) during operation of the compute node (103).

A data communications mode specifies a data communications fabric type, a data communications link, and a data communications protocol (178). A data communications link (156) is data communications connection between a host computer and an accelerator. In the example of FIG. 2, a link (156) between the host computer (110) and the accelerator (104) may include the PCIe connection (138) or the Ethernet connection (131, 132) through the Ethernet network (106). A link (156) between the host computer (110) and the accelerator (105) in the example of FIG. 2, may include the PCIe connection (136) or the Ethernet connection (131, 134) through the Ethernet network (106). Although only one link for each fabric type is illustrated between the host computer and the accelerator in the example of FIG. 2, readers of skill in the art will immediately recognize that there may any number of links for each fabric type.

A data communications protocol is a set of standard rules for data representation, signaling, authentication and error detection required to send information from a host computer (110) to an accelerator (104). In the example of FIG. 2, the SLMPM (146) may select one of several protocols (178) for data communications between the host computer (110) and the accelerator. Examples of such protocols (178) include shared memory transfers ('SMT') (180) executed with a send and receive operations (181), and direct memory access ('DMA') (182) executed with PUT and GET operations (183).

Shared memory transfer is a data communications protocol for passing data between a host computer and an accelerator into shared memory space (158) allocated for such a purpose such that only one instance of the data resides in memory at any time. Consider the following as an example shared memory transfer between the host computer (110) and the accelerator (104) of FIG. 2. An application (166) requests (168) a transmission of data (176) from the host computer (110) to the accelerator (104) in accordance with the SMT (180) protocol. Such a request (168) may include a memory address allocated for such shared memory. In this example, the shared memory segment (158) is illustrated in a memory location on the accelerator (104), but readers will recognize that shared memory segments may be located on the accelerator (104), on the host computer (110), on both the host computer and the accelerator, or even off the local compute node (103) entirely—so long as the segment is accessible as needed by the host and the accelerator. To carry out a shared memory transfer, the SLMPM (146) on the host computer (110) establishes a data communications connection with the SLMPM (146) executing on the accelerator (104) by a handshaking procedure similar to that in the TCP protocol. The SLMPM (146) then creates a message (170) that includes a header and a payload data and inserts the message into a message transmit queue for a particular link of a particular fabric. In creating the message, the SLMPM inserts, in the header of the message, an identification of the accelerator and an identification of a process executing on the accelerator. The SLMPM also inserts the memory address from the request (168) into the message, either in the header or as part of the payload data. The SLMPM also inserts the data (176) to be transmitted in the message (170) as part of the message payload data. The message is then transmitted by a communications adapter (160, 161) across a fabric (128, 130) to the SLMPM executing on the accelerator (104) where the SLMPM stores the payload data, the data (176) that was transmitted, in shared memory space (158) in RAM (140) in accordance with the memory address in the message.

Direct memory access ('DMA') is a data communications protocol for passing data between a host computer and an accelerator with reduced operational burden on the computer processor (152). A DMA transfer essentially effects a copy of a block of memory from one location to another, typically from a host computer to an accelerator or vice versa. Either or both a host computer and accelerator may include DMA engine, an aggregation of computer hardware and software for direct memory access. Direct memory access includes reading and writing to memory of accelerators and host computers with reduced operational burden on their processors. A DMA engine of an accelerator, for example, may write to or read from memory allocated for DMA purposes, while the processor of the accelerator executes computer program instructions, or otherwise continues to operate. That is, a computer processor may issue an instruction to execute a DMA transfer, but the DMA engine, not the processor, carries out the transfer.

In the example of FIG. 2, only the accelerator (104) includes a DMA engine (184) while the host computer does not. In this embodiment the processor (152) on the host computer initiates a DMA transfer of data from the host to the accelerator by sending a message according to the SMT protocol to the accelerator, instructing the accelerator to perform a remote 'GET' operation. The configuration illustrated in the example of FIG. 2 in which the accelerator (104) is the only device containing a DMA engine is for explanation only, not for limitation. Readers of skill in the art will immediately recognize that in many embodiments, both a host computer and an accelerator may include a DMA engine, while in yet other embodiments only a host computer includes a DMA engine.

To implement a DMA protocol in the hybrid computing environment of FIG. 2 some memory region is allocated for access by the DMA engine. Allocating such memory may be carried out independently from other accelerators or host computers, or may be initiated by and completed in cooperation with another accelerator or host computer. Shared memory regions, allocated according to the SMA protocol, for example, may be memory regions made available to a DMA engine. That is, the initial setup and implementation of DMA data communications in the hybrid computing environment (100) of FIG. 2 may be carried out, at least in part, through shared memory transfers or another out-of-band data communications protocol, out-of-band with respect to a DMA engine. Allocation of memory to implement DMA transfers is relatively high in latency, but once allocated, the DMA protocol provides for high bandwidth data communications that requires less processor utilization than many other data communications protocols.

A direct 'PUT' operation is a mode of transmitting data from a DMA engine on an origin device to a DMA engine on a target device. A direct 'PUT' operation allows data to be transmitted and stored on the target device with little involvement from the target device's processor. To effect minimal involvement from the target device's processor in the direct 'PUT' operation, the origin DMA engine transfers the data to be stored on the target device along with a specific identification of a storage location on the target device. The origin DMA knows the specific storage location on the target device because the specific storage location for storing the data on the target device has been previously provided by the target DMA engine to the origin DMA engine.

A remote 'GET' operation, sometimes denominated an 'rGET,' is another mode of transmitting data from a DMA engine on an origin device to a DMA engine on a target device. A remote 'GET' operation allows data to be transmitted and stored on the target device with little involvement from the origin device's processor. To effect minimal involvement from the origin device's processor in the remote 'GET' operation, the origin DMA engine stores the data in an storage location accessible by the target DMA engine, notifies the target DMA engine, directly or out-of-band through a shared memory transmission, of the storage location and the size of the data ready to be transmitted, and the target DMA engine retrieves the data from storage location.

Monitoring data communications performance for a plurality of data communications modes may include monitoring a number of requests (168) in a message transmit request queue (162-165) for a data communications link (156). In the example of FIG. 2, each message transmit request queue (162-165) is associated with one particular data communications link (156). Each queue (162-165) includes entries for messages (170) that include data (176) to be transmitted by the communications adapters (160, 161) along a data communications link (156) associated with queue.

Monitoring data communications performance for a plurality of data communications modes may also include monitoring utilization of a shared memory space (158). In the example of FIG. 2, shared memory space (158) is allocated in RAM (140) of the accelerator. Utilization is the proportion of the allocated shared memory space to which data has been stored for sending to a target device and has not yet been read or received by the target device, monitored by tracking the writes and reads to and from the allocated shared memory. In the hybrid computing environment (100) of FIG. 2, shared memory space, any memory in fact, is limited. As such, a shared memory space (158) may be filled during execution of an application program (166) such that transmission of data from the host computer (110) to an accelerator may be slowed, or even stopped, due to space limitations in the shared memory space.

In some embodiments of the present invention, the hybrid computing environment (100) of FIG. 2 may be configured to operate as a parallel computing environment in which two or more instances the application program (166) executes on two or more host computers (110) in the parallel computing environment. In such embodiments, monitoring data communications performance across data communications modes may also include aggregating data communications performance information (174) across a plurality of instances of the application program (166) executing on two or more host computers in a parallel computing environment. The aggregated performance information (174) may be used to calculate average communications latencies for data communications modes, average number of requests in data communications links of a particular fabric type, average shared memory utilization among the plurality of host computers and accelerators in the parallel computing environment, and so on as will occur to those of skill in the art. Any combination of such measures may be used by the SLMPM for both determining whether to transmit the data according to requested data communications mode and selecting another data communications mode for transmitting the data if the data is not to be transmitted according to the requested data communications mode.

The SLMPM (146) of FIG. 2 receives, from an application program (166) on the host computer (110), a request (168) to transmit data (176) according to a data communications mode from the host computer (110) to the accelerator (104). Such data (176) may include computer program instructions compiled for execution by the accelerator (104), such as an executable file of an accelerator application program, work piece data for an accelerator application program, files necessary for execution of an accelerator application program, such as libraries, databases, drivers, and the like. Receiving a request (168) to transmit data (176) according to a data communications mode may include receiving a request to transmit data by a specified fabric type, receiving a request to transmit data through a specified data communications link from the host computer to the accelerator, or receiving a request to transmit data from the host computer to the accelerator according to a protocol.

A request (168) to transmit data (176) according to a data communications mode may be implemented as a user-level application function call through an API to the SLMPM (146), a call that expressly specifies a data communications mode according to protocol, fabric type, and link. A request implemented as a function call may specify a protocol according to the operation of the function call itself. A dacs_put( ) function call, for example, may represent a call through an API exposed by an SLMPM implemented as a DACS library to transmit data in the default mode of a DMA 'PUT' operation. Such a call, from the perspective of the calling application and the programmer who wrote the calling application, represents a request to the SLMPM library to transmit data according to the default mode, known to the programmer to be default mode associated with the express API call. The called function, in this example dacs_put( ) may be coded in embodiments with multiple fabric types, protocols, and links, to make its own determination whether to transmit the data according to the requested data communications mode, that is, according to the default mode of the called function. In a further example, a dacs_send( ) instruction may represent a call through an API exposed by an SLMPM implemented as a DACS library to transmit data in the default mode of an SMT 'send' operation, where the called function dacs_send( ) is again coded in embodiments with multiple fabric types, protocols, and links, to make its own determination whether to transmit the data according to the requested mode.

An identification of a particular accelerator in a function call may effectively specify a fabric type. Such a function call may include as a call parameters an identification of a particular accelerator. An identification of a particular accelerator by use of a PCIe ID, for example, effectively specifies a PCI fabric type. In another, similar, example, an identification of a particular accelerator by use of a media access control ('MAC') address of an Ethernet adapter effectively specifies the Ethernet fabric type. Instead of implementing the accelerator ID of the function call from an application executing on the host in such a way as to specify a fabric type, the function call may only include a globally unique identification of the particular accelerator as a parameter of the call, thereby specifying only a link from the host computer to the accelerator, not a fabric type. In this case, the function called may implement a default fabric type for use with a particular protocol. If the function called in the SLMPM is configured with PCIe as a default fabric type for use with the DMA protocol, for example, and the SLMPM receives a request to transmit data to the accelerator (104) according to the DMA protocol, a DMA PUT or DMA remote GET operation, the function called explicitly specifies the default fabric type for DMA, the PCIe fabric type.

In hybrid computing environments in which only one link of each fabric type adapts a single host computer to a single accelerator, the identification of a particular accelerator in a parameter of a function call, may also effectively specify a link. In hybrid computing environments where more than one link of each fabric type adapts a host computer and an accelerator, such as two PCIe links connecting the host computer (110) to the accelerator (104), the SLMPM function called may implement a default link for the accelerator identified in the parameter of the function call for the fabric type specified by the identification of the accelerator.

The SLMPM (146) in the example of FIG. 2 also determines, in dependence upon the monitored performance (174), whether to transmit the data (176) according to the requested data communications mode. Determining whether to transmit the data (176) according to the requested data communications mode may include determining whether to transmit data by a requested fabric type, whether to transmit data through a requested data communications link, or whether to transmit data according to a requested protocol.

In hybrid computing environments according to embodiments of the present invention, where monitoring data communications performance across data communications modes includes monitoring a number of requests in a message transmit request queue (162-165) for a data communications link, determining whether to transmit the data (176) according to the requested data communications mode may be carried out by determining whether the number of requests in the message transmit request queue exceeds a predetermined threshold. In hybrid computing environments according to embodiments of the present invention, where monitoring data communications performance for a plurality of data communications modes includes monitoring utilization of a shared memory space, determining whether to transmit the data (176) according to the requested data communications mode may be carried out by determining whether the utilization of the shared memory space exceeds a predetermined threshold.

If the data is not to be transmitted according to the requested data communications mode, the SLMPM (146) selects, in dependence upon the monitored performance, another data communications mode for transmitting the data and transmits the data (176) according to the selected data communications mode. Selecting another data communications mode for transmitting the data may include selecting, in dependence upon the monitored performance, another data communications fabric type by which to transmit the data, selecting a data communications link through which to transmit the data, and selecting another data communications protocol. Consider as an example, that the requested data communications mode is a DMA transmission using a PUT operation through link (138) of the PCIe fabric (130) to the accelerator (104). If the monitored data performance (174) indicates that the number of requests in transmit message request queue (162) associated with the link (138) exceeds a predetermined threshold, the SLMPM may select another fabric type, the Ethernet fabric (128), and link (131, 132) through which to transmit the data (176). Also consider that the monitored performance (176) indicates that current utilization of the shared memory space (158) is less than a predetermined threshold while the number of outstanding DMA transmissions in the queue (162) exceeds a predetermined threshold. In such a case, the SLMPM (146) may also select another protocol, such as a shared memory transfer, by which to transmit the data (174).

Selecting, by the SLMPM, another data communications mode for transmitting the data (172) may also include selecting a data communications protocol (178) in dependence upon data communications message size (172). Selecting a data communications protocol (178) in dependence upon data communications message size (172) may be carried out by determining whether a size of a message exceeds a predetermined threshold. For larger messages (170), the DMA protocol may be a preferred protocol as processor utilization in making a DMA transfer of a larger message (170) is typically less than the processor utilization in making a shared memory transfer of a message of the same size.

As mentioned above, the SLMPM may also transmit the data according to the selected data communications mode. Transmit the data according to the selected data communications mode may include transmitting the data by the selected data communications fabric type, transmitting the data through the selected data communications link, or transmitting the data according to the selected protocol. The SLMPM (146) may effect a transmission of the data according to the selected data communications mode by instructing, through a device driver, the communications adapter for the data communications fabric type of the selected data communications mode to transmit the message (170) according to a protocol of the selected data communications mode, where the message includes in a message header, an identification of the accelerator, and in the message payload, the data (176) to be transmitted.

The example SLMPM (146) in the hybrid computing environment (100) of FIG. 2 operates generally for executing an accelerator application program (167) on an accelerator (104, 105) according to embodiments of the present invention. An 'accelerator' application program is an application program executed on an accelerator that performs one or more tasks for the benefit of a host application program that requested the execution of the accelerator application program. A 'host' application program, by contrast, is an application that runs on a host computer and requests execution of one or more accelerator application programs for its own benefit. An accelerator typically processes the accelerator application program in an accelerated fashion, that is, the accelerator carries out the one or more functions of the accelerator application program faster than the functions would normally be processed by a host computer due to the fact that the accelerator's architecture is optimized, with respect to the host computer architecture, for speed of execution of the one or more functions.

The SLMPM (146) in the example of FIG. 2 may execute an accelerator application program (167) on an accelerator (104, 105) according to embodiments of the present invention by receiving, from a host application program (166) on a host computer (110), operating information (202) for an accelerator application program (167); designating a directory as a CWD (218) for the accelerator application program (167), separate from any other CWDs of any other applications running on the accelerator; assigning, to the CWD (218), a name that is unique with respect to names of other CWDs of other applications in the computing environment; and starting the accelerator application program (167) on the accelerator (104,105).

Stored in the example CWD (218) of FIG. 2 is the accelerator application program (167), the executable file made up of computer program instructions that when executed provide accelerator application functionality. The CWD (218) in this example is illustrated in RAM (140), a region of which is operating as a RAM disk (219). A RAM disk is a software abstraction that treats a segment of RAM as secondary storage, a role typically filled by hard disk drives. Although CWDs designated according to embodiments of the present invention may be designated in such RAM disks, readers of skill in the art will recognize that such directories may also be designated in other forms of storage, such as hard disk drives implemented as part of a compute node or even external to a compute node. Readers of skill in the art will recognize that, typically, when the accelerator application program is executed the computer program instructions may be loaded into a program stack at a memory location in RAM other than the CWD (218), other than the RAM disk (219). That is, although the accelerator application program (167) file, the executable file, in the example of FIG. 2 is illustrated in a directory of a file system, the accelerator application program (167) may execute in a memory location other than the CWD.

'Operating information' as the term is used in the specification refers to information used in starting, maintaining, and terminating execution of an accelerator application program. In the example of FIG. 2, the operating information (202) includes application execution parameters (204), environment variables (206), and a value (208) of a substitution variable identifying a current working directory ('CWD') for the accelerator application program (167). A substitution variable as the term is used in this specification is a variable representing a CWD of an accelerator application program, used as a temporary placeholder for a permanent variable representing the CWD of the accelerator application. Such a substitution variable may be used for many reasons, but one reason is to enable a host application program to refer to the CWD of an accelerator application prior to the designation of such a CWD, prior to an assignment of a name to such a CWD, even prior to the execution of the accelerator application program. The CWD in embodiments of the present invention is represented in the execution parameters (204) and in the environment variables (206) by the value (208) of such a substitution variable.

Application execution parameters (204), also referred to as execution arguments, are parameters provided to a newly executed accelerator application program and used throughout execution of the program. Examples of such parameters (204) include text, names of accelerator application programs, paths to accelerator application program files, paths to configuration files, paths to application program files other than an accelerator application program file, other application program names, Uniform Resource Locators ('URLs') identifying locations of other files, and so on as will occur to readers of skill in the art. As mentioned above, the CWD (218) is represented in the execution parameters (204) of the operating information (202) received from a host application program (166) by the value (208) of a substitution variable. Consider, as an example, that the value (208) of such a substitution variable is 'TempCWD.' In such a case, an example application execution parameter (204) representing a path to an example configuration file named 'ConfigurationFile,' where the path includes the CWD as a subdirectory, may be expressed as /usr/bin/TempCWD/ConfigurationFile.

Environment variables (206) are a set of dynamic values than may affect the way an accelerator application program behaves while running on an accelerator. Examples of environment variables include:
PATH, a variable that represents a list of directories in which executable files to be executed are located;
HOME, a variable that represents a path to a user's home directory in a file system;
TEMP, a variable that represents a path to a directory to store temporary files;
USERNAME, a variable that represents the username associated with the current user;
USERPROFILE a variable that represents a path to a directory in which the current user's profile is stored;
LD_LIBRARY_PATH for Unix, a variable that represents a list of directories that a dynamic linker should search for shared objects when building a process image after an 'exec' system command, before searching other directories; and
Other variables as will occur to readers of skill in the art.

As mentioned above, the CWD is represented in the environment variables of the operating information (202) received from the host application program (166) by the value (208) of a substitution variable. Consider, as in the example above, that the value of such a substitution variable is 'TempCWD.' In such a case, an example environment variable (206) that identifies a path to a directory, such as the PATH variable listed above, where the path includes the CWD of the accelerator application program, may be expressed as /usr/bin/TempCWD/executables.

In some embodiments of the present invention, operating information (202) may also include the name (214) of the accelerator application program (167), an identity (210) of an accelerator, and a list (212) of files to transfer to the accelerator. The name (214) of the accelerator application program (167) is a name of the executable file of the accelerator application program (167). An identity (210) of an accelerator may be PCIe ID, a MAC address of an Ethernet adapter of an accelerator, globally unique identification of the particular accelerator and so on, of the accelerator on which the accelerator application program is to be executed. The list of files (216) to transfer to the accelerator may be implemented as a list of pointers to file locations, Unix-like paths for example. Such files (216) may include work piece data for the accelerator application program, an executable file of the accelerator application program itself, executable files for other applications typically executed for complete, proper execution of the accelerator application program, library files for proper execution of the accelerator application program, files containing various user settings, and so on as will occur to those of skill in the art.

The SLMPM (146) of FIG. 2 may receive operating information (202) for the accelerator application program (167) by receiving, from a host application program through an API, a function call to an SLMPM function with parameters that identify operating information. The following function call, written in pseudocode for clarity of explanation, is an example of a function call with parameters that identify operating information: dacs_de_start (Acc_ID_1, "AcceleratorAppn", "ArgList", "VarsList", CWD=TempCWD). This example function call is 'pseudocode,' so called because it is an explanation expressed in the form of code as opposed to an actual working model of computer code. This pseudocode example is a call to a DACS library function called 'de_start' which starts an accelerator application program on an accelerator. The parameters of the function include an identity of the accelerator, 'ACC_ID_1,' a name of an accelerator application program, 'AcceleratorAppn,' a pointer to a file named 'ArgList' that contains a list of execution parameters (204), a pointer to a file named 'VarsList' that contains a list of environment variables (206), and a value (208) of a substitution variable 'TempCWD' identifying a current working directory ('CWD') for the accelerator application program (167).

In some embodiments of the present invention, the list of environment variables (206) identified by the 'ArgList' parameter of the function call may contain an environment variable that in turn specifies a list (212) of files to transfer to the accelerator. An example of such an environment variable may be expressed as DACS_START_FILES="AccAppFileList" where each entry in the list of the file named 'AccAppFileList' is a path of a file to transfer to the accelerator. Such files may be any files necessary for complete and proper execution of an accelerator application program including, for example, the executable file of the accelerator application program itself, files of library functions called during execution of the accelerator application program, data files used in executing the accelerator application program, and so on as will occur to readers of skill in the art.

The example SLMPM (146) of the accelerator (104) of FIG. 2 may designate a directory as a CWD (218) for the accelerator application program (167), separate from any other CWDs of any other applications running on the accelerator (104) by creating a directory using a Unix-type 'mkdir' system command that creates a directory with a user-specified path. The command 'mkdir/usr/bin/TempCWD' is an example of a Unix-type 'mkdir' command which upon execution creates a directory located at the user-specified path '/usr/bin/TempCWD.'

In some embodiments, more than one instance of the same accelerator application program may be running on a single accelerator, each with variations in workpiece data, data sources, configuration settings, and so on. Designating a CWD (218) for the accelerator application program (167) that is separate from any other CWDs of any other applications running on the accelerator (104) reduces the risk of the accelerator application program (167) accessing files, workpiece data, data sources, configuration settings, and the like of another application program. The SLMPM (146) may insure that the created directory is separate from any other CWDs of any other applications running on the accelerator by monitoring creation and deletion of all CWDs of application running on the accelerator as, typically, accelerator applications are only executed through function calls to the SLMPM.

The example SLMPM (146) of the accelerator (104) of FIG. 2 may assign, to the CWD (218), a name that is unique with respect to names of other CWDs of other applications in the computing environment by forking into a new process, using a Unix-type 'fork' system command, and executing a Unix-type 'chdir' command. Upon executing a Unix-type 'fork' system command, the SLMPM (146) is forked into a new process referred to here as the forked process. The forked process is assigned a process ID, unique with respect to the calling process, and inherits the calling process's CWD. That is, at the time of a fork, the calling process and the forked process have the same CWD. The forked process may then execute a 'chdir' command that changes the value of the CWD for the forked process. As mentioned above, the SLMPM may monitor creation and deletion of CWDs on the accelerator and, as such, may use a 'chdir' command to insure that the name assigned to the current working directory is unique with respect to names of other CWDs.

Assigning a name to the CWD (218) that is unique with respect to names of other CWDs of other applications in the computing environment may also be carried out by assigning a temporary name to the CWD (218). A temporary name of a directory, as used in this specification, is a name to be later replaced by a 'permanent' name. A temporary name may be implemented as the value of the substitution variable, a random character string generated by the SLMPM and registered with the SLMPM in association with the host and accelerator application, a process ID of the forked process, a timestamp, and so on as will occur to those of skill in the art.

In some embodiments of the present invention, the host application program (166) may register with the SLMPM (146) indicating a request to be informed of the name assigned to the CWD (218) of an accelerator application program by the SLMPM (146) when executing the accelerator application program (167) at the behest of the host application program (166). In such embodiments, upon starting the accelerator application program (167), the SLMPM may return the assigned name of the CWD (218) with the process ID of the accelerator application program (167) to the host application program (166). The host application program may then refer to the CWD (218) of the accelerator application program, throughout operation of the host and accelerator application programs, with the assigned name, not the value of the substitution variable.

In other embodiments of the present invention, the SLMPM (146) may assign a name without informing the host application program (166) of the name assigned to the CWD (218). Upon starting the accelerator application program (167), then, the SLMPM (146) may only return the process ID of the accelerator application program (167)—not the assigned name of the CWD (218). That is, even after the SLMPM (146) designates a CWD (218) and assigns a name to the CWD (218) for the accelerator application program (167), the host application program (166) may refer to the CWD (218) of the accelerator application program (167) in requests, using a combination of the identity of the accelerator (104) on which the accelerator application program (167) is executing, the process ID of the accelerator application program (167), and the value (208) of the substitution variable. In carrying out any such request from the host application program (166), the SLMPM (146) may determine from the accelerator ID, process ID, and the value of the substitution variable, the assigned name of the CWD (218). The host application program (166) therefore is relieved from any need to formulate a name for a CWD (218), create a CWD (218), remove a CWD (218), or otherwise maintain a CWD (218) for the accelerator application program (167). Moreover, as no module running on the host computer (110) other than the SLMPM (146) is aware of the name assigned to the CWD (218), security risk with respect to the CWD (218) of the accelerator application program (167) is greatly reduced.

As mentioned, operating information (202) in some embodiments of the present invention may include the identity of the accelerator (210), a list (212) of files (216) to transfer to the accelerator (104), and the name (214) of the accelerator application program (167). In those embodiments, after the SLMPM (146) assigns a name to the CWD, the SLMPM (146) may transfer the files (216) identified in the operating information (202) from the host computer (110) to the CWD (218) on the accelerator (104). Transferring such files (216) in the example of FIG. 2 may be carried out by transferring the files (216) from the SLMPM (146) running on the host computer (110) to the SLMPM (146) running on the accelerator (104) according to a data communications mode, with DMA transfers, SMT transfers, over PCI fabrics, Ethernet Fabrics, and so on as will occur to readers of skill in the art. Once received by the SLMPM (146) running on the accelerator (104), the SLMPM (146) may copy or move the files into the CWD (218) designated for the accelerator application program (167) with a Unix-type 'cp' command or 'mv' command respectively.

The SLMPM (146) may also transfer files (216) identified in the operating information (202) from the host computer (110) to the accelerator (104) in embodiments of the present invention in which the SLMPM (146) assigns a temporary name to the CWD, by transferring files (216) identified in the operating information (202) using the temporary name assigned to the CWD. The SLMPM on may transfer files (216) identified in the operating information (202) from the host computer (110) to the accelerator (104) using the temporary name assigned to the CWD (218) by first transferring the files according to a data communications mode, with DMA, transfer, SMT transfers, over PCI fabrics, Ethernet Fabrics and so on. Once received by the SLMPM (146) running on the accelerator, the SLMP may copy or move the files into the CWD with a Unix-type 'cp' command or 'mv' command respectively. Copying a file named /usr/bin/ExampleFile.txt into a CWD with a temporary name of /usr/bin/TempCWD may be carried out, for example, with the following Unix-type 'cp' command: cp /usr/bin/ExampleFile.txt /usr/bin/TempCWD. Moving a file named /usr/bin/ExampleFile.txt into a CWD with a temporary name of /usr/bin/TempCWD may be carried out, for example, with the following Unix-type 'mv' command: mv /usr/bin/ExampleFile.txt /usr/bin/TempCWD.

In some hybrid computing environments (100) according to embodiments of the present invention, memory available for secondary storage is scarce. That is, hard disk space in some embodiments, whether internal or external to a compute node, may be limited, if not completely unavailable. Instead of using such hard disk space as secondary storage, many hybrid computing environments implement a RAM disk as described above. RAM resources therefore may become very scarce in some hybrid computing environments (100) useful for executing accelerator applications according to embodiments of the present invention. To reduce the amount of memory used by an accelerator application's CWD (218), the SLMPM (146) of FIG. 2 may be configured to write, to the CWD, files (216) identified in the operating information (202) as files to transfer from the host computer (110) to the accelerator (104) and limit the CWD (218) to read and execute access only by the accelerator application program (167). The SLMPM (146) on the accelerator (104) may write such files to the CWD (218) as described above, with a Unix-type 'mv' or 'cp' command. Limiting the CWD (218) to read and execute access only by the accelerator application program (167) may be carried out by one or more Unix-type 'chmod' system commands. One example set of chmod system commands which may limit the CWD of the accelerator application program to read and execute permission only includes chmod go=CWDname followed by chmod u=rx, where 'g' represents members of the Unix-type group, 'o' represents members of the Unix-type other, 'r' represents read permissions, 'x' represents execute permissions, and CWDname is the name of the accelerator application program's CWD. The above commands first remove all file access permissions from members of the Unix-type 'group' and members of the Unix-type 'others,' then granting read and execute permissions to the user of the directory, the accelerator application program.

In some hybrid computing environments (100) according to embodiments of the present invention, the example SLMPM (146) of FIG. 2 may limit all access to the CWD (218) exclusively to the accelerator application program (167). Limiting all access to the CWD (218) exclusively to the accelerator application program (167) may be carried out by one or more Unix-type 'chmod' system commands, such as chmod a=CWDname followed by chmod u=rwx. Limiting all access to the CWD exclusively to the accelerator application program (167) reduces the security risks of extremely ill-behaved applications attempting to gain access to the CWD, an intentional security violation.

The example SLMPM (146) of FIG. 2 may start the accelerator application program (167) on the accelerator (104) by executing a Unix-type 'fork' system command, forking the SLMPM (146) into two processes, where the forked process calls a Unix-type 'exec' system command, using as an argument to the 'exec' system command, the name of the executable file of the accelerator application program (167) stored in the CWD (218). The fork-exec system commands may be carried out such that the calling process, the SLMPM (146) on the accelerator (104), receives upon completion of fork-exec command, the process ID of the newly executed process, the accelerator application program (167). The SLMPM (146) may then pass the process ID to the host application program (166) as a return value of the dacs_de_start function call mentioned above for use in starting accelerator application programs.

In hybrid computing environments (100) according to embodiments of the present invention in which a temporary name is assigned to the CWD (218) and files (216) are transferred from the host computer to the CWD (218) on the accelerator using the temporary name, the example SLMPM (146) on the accelerator (104) of FIG. 2 may start the accelerator application program (167) on the accelerator (104) by assigning a permanent name to the CWD (218). After a fork, but before the forked process executes an 'exec' system command, the forked process has a process ID unique with respect to the calling process. The forked process, again before calling the 'exec' command to start the accelerator application program (167), may retrieve its process ID using a Unix-type getpid( ) instruction and incorporate the retrieved process ID into a directory name, a permanent directory name, for the CWD (218). The forked process may also incorporate a timestamp, a random character string, an accelerator ID, the process ID of the host application program, or other values as part of the permanent directory name as will occur to readers of skill in the art.

Upon termination of the accelerator application program (167) on the accelerator (104) in the example of FIG. 2, the example SLMPM (146) may delete the CWD (218). The SLMPM (146) may delete the CWD by executing a Unix-type 'rm' command, such as rm usr/bin/AcclAppPID where usr/bin/AcclAppPID is the CWD of the accelerator application program (167). Deleting a CWD upon termination of the accelerator application may be useful because the 'drive' on the accelerator in which the CWD is stored may be a RAM disk in an environment where RAM is a limited resource. Deleting a CWD upon termination of the accelerator application may also increase security, so that other application programs are unable to easily locate and access information, data, files, applications programs, and the like associated with the accelerator application program in the form of files in a directory in a file system.

As an alternative to deleting the CWD (218), the example SLMPM (146) of FIG. 2 may be configured to retain the CWD (218) and its contents upon termination of the accelerator application program (167). The SLMPM may retain the files by not deleting the CWD and its contents upon termination of the accelerator application program but instead only setting file access permission to read and write permission for all but a Unix-type 'superuser' or 'root.' Retaining such files may be useful when termination is abnormal, that is, when termination of the accelerator application program is caused by a fatal error, a non-zero exit, an exit on an exception, for determining causes of such abnormal terminations, data recovery, and other benefits as will occur to those of skill in the art.

Figure 3:
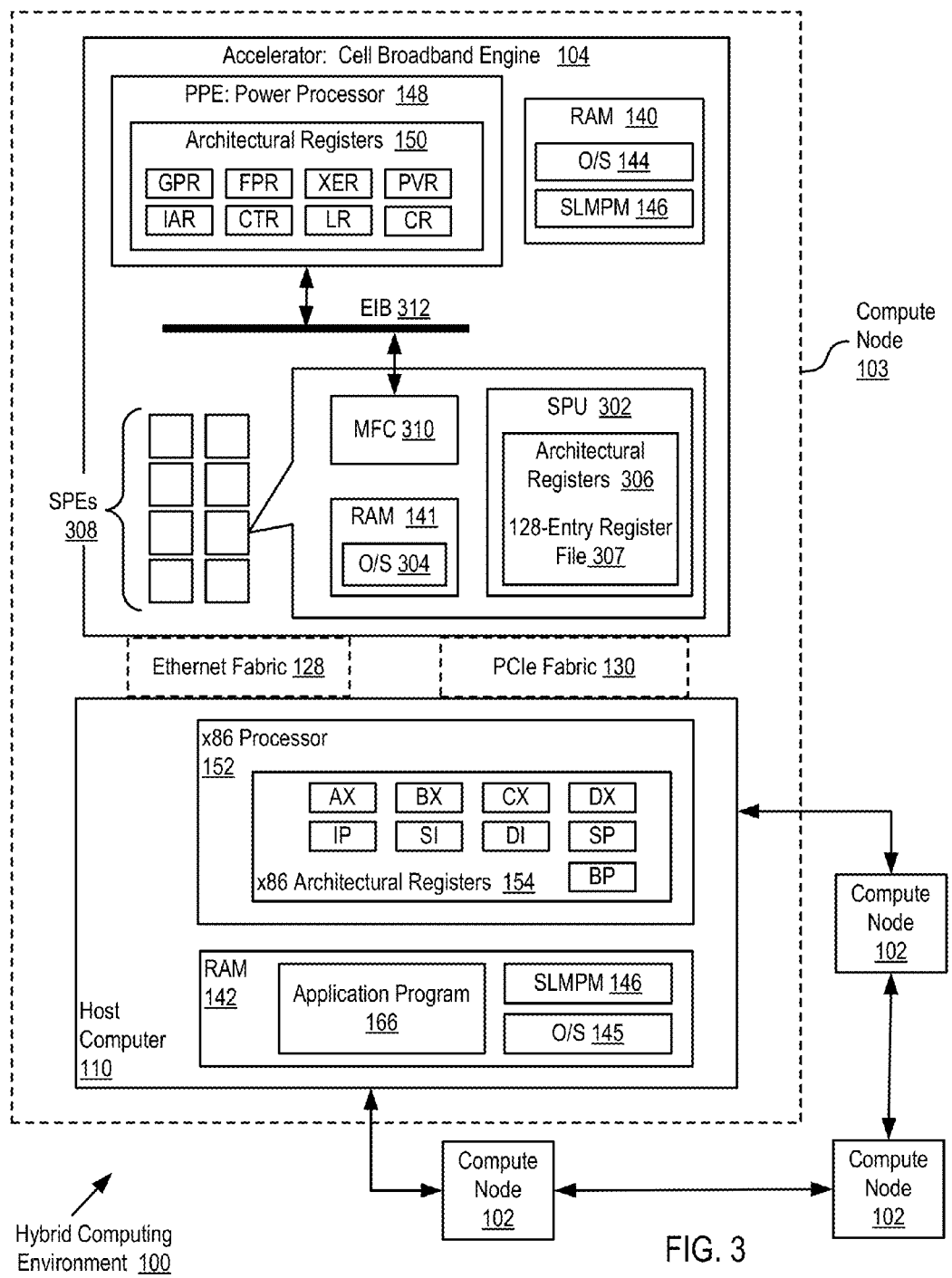
FIG. 3 sets forth a block diagram of a further exemplary hybrid computing environment useful for executing an accelerator application according to embodiments of the present invention.

For further explanation, FIG. 3 sets forth a block diagram of a further exemplary hybrid computing environment (100) useful for executing an accelerator application according to embodiments of the present invention. The hybrid computing environment of FIG. 3 is similar the hybrid computing environment of FIG. 2, including as it does, four compute nodes (102, 103), each of which includes a host computer (110) having a host computer architecture and an accelerator (104) having an accelerator architecture where the accelerator architecture is optimized, with respect to the host computer architecture, for speed of execution of a particular class of computing functions. The host computer (110) and the accelerator (104) are adapted to one another for data communications by a system level message passing module (146) and two or more data communications fabrics (128, 130) of at least two different fabric types. In the example of FIG. 3, the host computer (110) is adapted to accelerator (104) by an Ethernet fabric (128) and a PCIe fabric (130).

The host computer (110) as illustrated in the expanded view of the compute node (103) includes an x86 processor. An x86 processor is a processor whose architecture is based upon the architectural register set of the Intel x86 series of microprocessors, the 386, the 486, the 586 or Pentium™, and so on. Examples of x86 processors include the Advanced Micro Devices ('AMD') Opteron™, the AMD Phenom™, the AMD Athlon XP™, the AMD Athlon 64™, Intel Nehalam™, Intel Pentium 4, Intel Core 2 Duo, Intel Atom, and so on as will occur to those of skill in the art. The x86 processor (152) in the example of Figure illustrates a set of a typical architectural registers (154) found in many x86 processors including, for example, an accumulator register ('AX'), a base register ('BX'), a counter register ('CX'), a data register ('DX'), a source index register for string operations ('SI'), a destination index for string operations ('DI'), a stack pointer ('SP'), a stack base pointer for holding the address of the current stack frame ('BP'), and an instruction pointer that holds the current instruction address ('IP').

The accelerator (104) in the example of FIG. 3 is illustrated as a Cell Broadband Engine ('CBE') having a Cell Broadband Engine Architecture ('CBEA'). A CBEA is a microprocessor architecture jointly developed by Sony Computer Entertainment, Toshiba, and IBM, an alliance known as "STI." Microprocessors implemented according to the CBEA are sometimes referred to as 'Cell' processors or simply as CBEs. The CBEA combines a general-purpose POWER architecture core, a Power Processing Element ('PPE') (148), of modest performance with streamlined co-processing elements, called Synergistic Processing Elements ('SPEs') (308) which greatly accelerate multimedia and vector processing applications, as well as many other forms of dedicated computation. The CBE architecture emphasizes efficiency/watt, prioritizes bandwidth over latency, and favors peak computational throughput over simplicity of program code.

The accelerator (104) of FIG. 3, implemented as a CBE, includes a main processor (148) that in this example is a Power Processing Element ('PPE'), eight fully-functional co-processors called SPEs (308), and a high-bandwidth circular data bus connecting the PPE and the SPEs, called the Element Interconnect Bus ('EIB') (312). The PPE (148) is a POWER architecture processor with a two-way multi-threaded core acting as a controller for the eight SPEs (308). The term "POWER architecture" here refers to IBM's different generations of processor architectures, a broad term including all products based on POWER, PowerPC and Cell architectures. The architectural registers (150) of the PPE (148) of the CBE accelerator (104) therefore are different from those of the x86 processor (152) of the host computer (110). The PPE (148) of FIG. 3 includes an example set of architectural registers (150) of the POWER architecture, including 32 general purpose registers ('GPRs'), 32 floating point registers ('FPRs'), a fixed-point exception register ('XER'), a count register ('CTR'), a Condition register ('CR'), an instruction address register ('IAR'), a link register ('LR'), and a processor version register ('PVR').

The SPEs (308) handle most of the computational workload of the CBE (104). While the SPEs are optimized for vectorized floating point code execution, the SPEs also may execute operating systems, such as, for example, a lightweight, modified version of Linux with the operating system stored in local memory (141) on the SPE. Each SPE (308) in the example of FIG. 3 includes a Synergistic Processing Unit ('SPU') (302), and a Memory Flow Controller ('MFC') (310). An SPU (302) is a Reduced Instruction Set Computing ('RISC') processor with 128-bit single instruction, multiple data ('SIMD') organization for single and double precision instructions. In some implementations, an SPU may contain a 256 KB embedded Static RAM (141) for instructions and data, called local storage which is visible to the PPE (148) and can be addressed directly by software. Each SPU (302) can support up to 4 Gigabyte ('GB') of local store memory. The local store does not operate like a conventional CPU cache because the local store is neither transparent to software nor does it contain hardware structures that predict which data to load. The SPUs (302) also implement architectural registers (306) different from those of the PPE which include a 128-bit, 128-entry register file (307). An SPU (302) can operate on 16 8-bit integers, 8 16-bit integers, 4 32-bit integers, or 4 single precision floating-point numbers in a single clock cycle, as well as execute a memory operation.

The MFC (310) integrates the SPUs (302) in the CBE (104). The MFC (310) provides an SPU with data transfer and synchronization capabilities, and implements the SPU interface to the EIB (312) which serves as the transportation hub for the CBE (104). The MFC (310) also implements the communication interface between the SPE (308) and PPE (148), and serves as a data transfer engine that performs bulk data transfers between the local storage (141) of an SPU (302) and CBE system memory, RAM (140), through DMA. By offloading data transfer from the SPUs (302) onto dedicated data transfer engines, data processing and data transfer proceeds in parallel, supporting advanced programming methods such as software pipelining and double buffering. Providing the ability to perform high performance data transfer asynchronously and in parallel with data processing on the PPE (148) and SPEs (302), the MFC (310) eliminates the need to explicitly interleave data processing and transfer at the application level.

The SLMPM (146) in the example of FIG. 3 processes data in the hybrid computing environment (100) by monitoring data communications performance for a plurality of data communications modes between the host computer (110) and the accelerator (104); receiving, from an application program (166) on the host computer (110), a request to transmit data according to a data communications mode from the host computer (110) to the accelerator (104); determining, in dependence upon the monitored performance, whether to transmit the data according to the requested data communications mode; and if the data is not to be transmitted according to the requested data communications mode: selecting, in dependence upon the monitored performance, another data communications mode for transmitting the data and transmitting the data according to the selected data communications mode.

The SLMPM (146) in the example of FIG. 3 executes an accelerator application program on an accelerator in a hybrid computing environment (100) according to embodiments of the present invention by receiving, from a host application program on a host computer, operating information for the accelerator application program the operating information including application execution parameters, environment variables, and a value of a substitution variable identifying a CWD for the accelerator application program, with the CWD represented in the execution parameters and in the environment variables by the value of the substitution variable; designating a directory as a CWD for the accelerator application program, separate from any other CWDs of any other applications running on the accelerator; assigning, to the CWD, a name that is unique with respect to names of other CWDs of other applications in the computing environment; and starting the accelerator application program on the accelerator.

Figure 4:
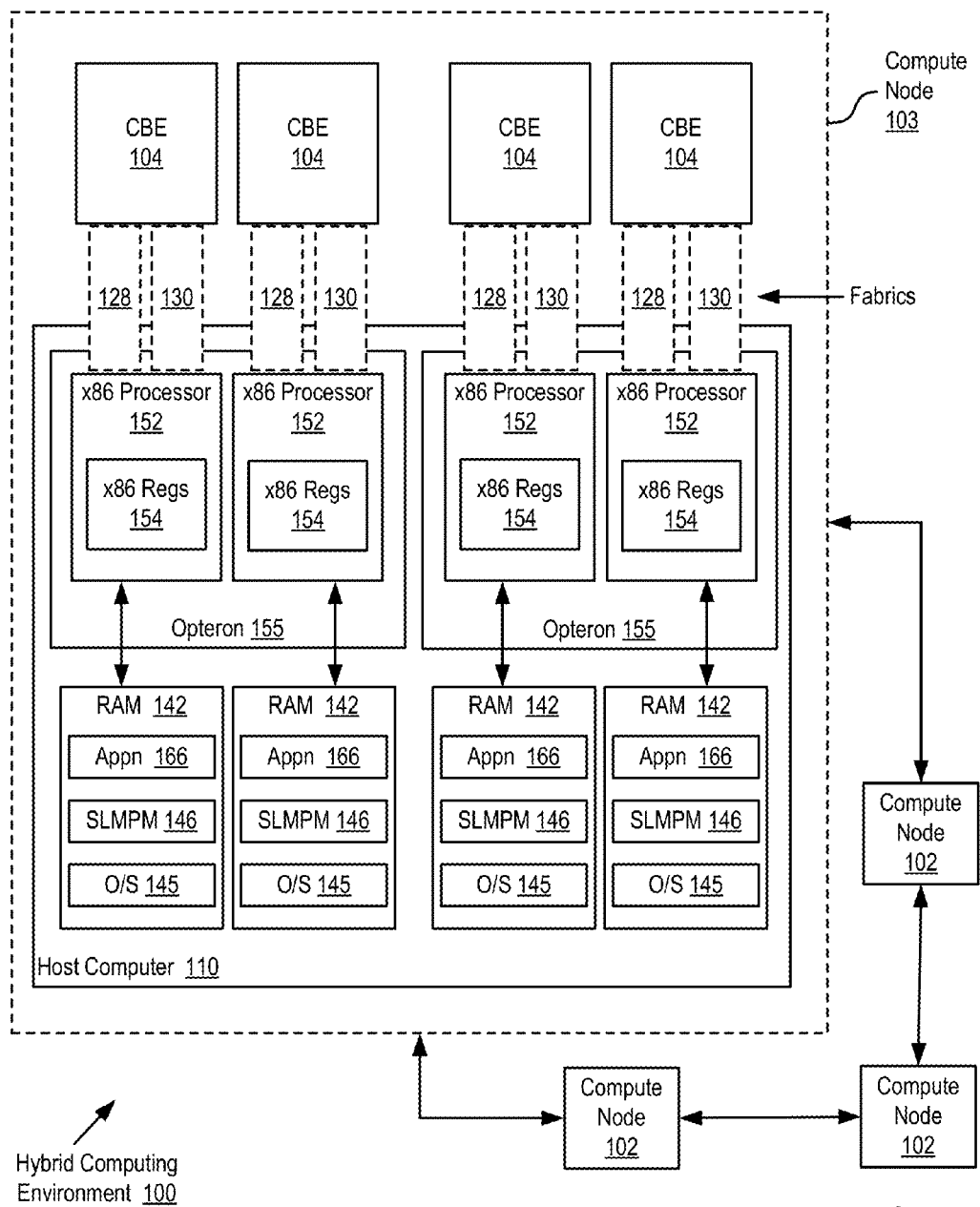
FIG. 4 sets forth a block diagram of a further exemplary hybrid computing environment useful for executing an accelerator application program according to embodiments of the present invention.

For further explanation, FIG. 4 sets forth a block diagram of a further exemplary hybrid computing environment (100) useful for executing an accelerator application program according to embodiments of the present invention according to embodiments of the present invention. The hybrid computing environment of FIG. 4 is similar the hybrid computing environment of FIG. 2, including as it does, four compute nodes (102, 103), each of which includes a host computer (110) having a host computer architecture and one or more accelerators (104) each having an accelerator architecture where the accelerator architecture is optimized, with respect to the host computer architecture, for speed of execution of a particular class of computing functions. The host computer (110) and the accelerator (104) in the example of FIG. 4 are adapted to one another for data communications by a system level message passing module (146) and two or more data communications fabrics (128, 130) of at least two different fabric types. In the example of FIG. 4, the host computer (110) is adapted to accelerator (104) by an Ethernet fabric (128) and a PCIe fabric (130).

FIG. 4 illustrates an example of a hybrid computing environment similar to that implemented in the LANL supercomputer. The host computer (110), as illustrated by the expanded view of the compute node (103), implemented in the LANL supercomputer includes two AMD Opteron processors (155), each of which is a dual-core processor. Each of the cores (152) of the host computer (110) is illustrated in the example of FIG. 4 as a single, fully functional x86 processor core with each core having its own set of architectural registers (154). Each of the processor cores (152) in the example of FIG. 4 is operatively coupled to RAM (142) where an instance of an application program (166), an instance of the SLMPM (146), and an operating system (145) is stored. In the example of the LANL supercomputer, the SLMPM (146) is the Data Communication and Synchronization ('DACS') library improved according to embodiments of the present invention.

Each x86 processor core (152) in the example of FIG. 4 is adapted through an Ethernet (128) and PCIe (130) fabric to a separate accelerator (104) implemented as a CBE as described above with respect to FIG. 3. Each core (152) of each AMD Opteron processor (155) in the host computer (110) in this example is connected to at least one CBE. Although in this example the ratio of cores of the Opteron processors to CBEs (104) is one-to-one, readers of skill in the art will recognize that other example embodiments may implement different ratios of processor cores to accelerators such as, for example, one-to-two, one-to-three, and so on.

Each instance of the SLMPM (146) executing on each x86 processor core (152) in the example of FIG. 4 processes data in the hybrid computing environment (100) by monitoring data communications performance across data communications modes between the host computer (110) and the accelerator (104) connected to the processor core (152); receiving, from the instance of the application program (166) executing on the processor core (152) of the host computer (110), a request to transmit data according to a data communications mode from the host computer (110) to the accelerator (104) connected to the processor core (152); determining, in dependence upon the monitored performance, whether to transmit the data according to the requested data communications mode; and if the data is not to be transmitted according to the requested data communications mode: selecting, in dependence upon the monitored performance, another data communications mode for transmitting the data and transmitting the data according to the selected data communications mode.

Each SLMPM (146) executing on each x86 processor core (152) in the example of FIG. 4 executes an accelerator application program on an accelerator in a hybrid computing environment (100) according to embodiments of the present invention by receiving, from the host application program (166), operating information for the accelerator application program the operating information including application execution parameters, environment variables, and a value of a substitution variable identifying a CWD for the accelerator application program, with the CWD represented in the execution parameters and in the environment variables by the value of the substitution variable; designating a directory as a CWD for the accelerator application program, separate from any other CWDs of any other applications running on the accelerator; assigning, to the CWD, a name that is unique with respect to names of other CWDs of other applications in the computing environment; and starting the accelerator application program on the accelerator.

Figure 5:
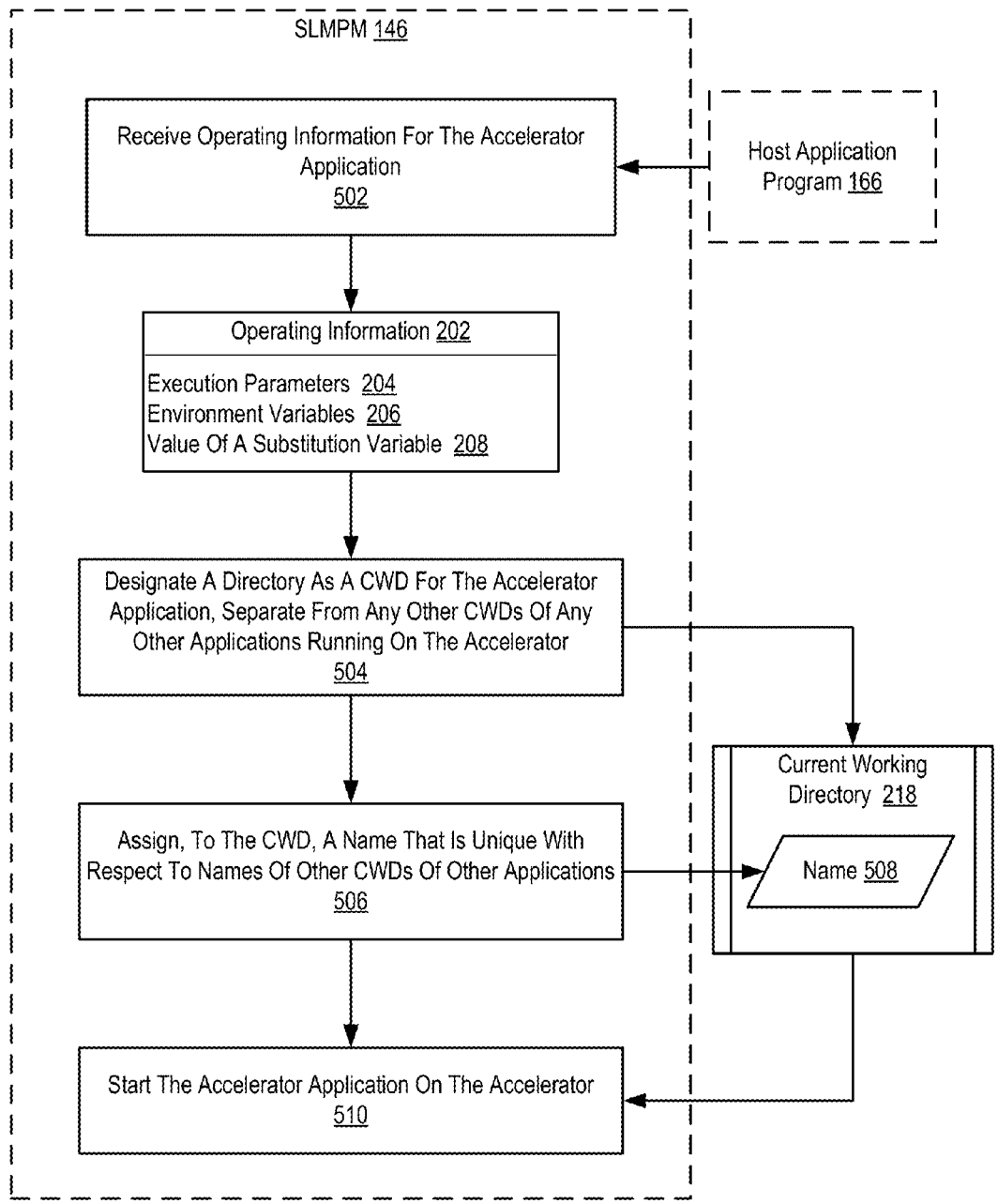
FIG. 5 sets forth a flow chart illustrating an exemplary method for executing an accelerator application program on an accelerator in a hybrid computing environment according to embodiments of the present invention.

For further explanation, FIG. 5 sets forth a flow chart illustrating an exemplary method for executing an accelerator application program on an accelerator in a hybrid computing environment according to embodiments of the present invention. The method of FIG. 5 is carried out in a hybrid computing environment similar to the hybrid computing environments described above in this specification. Such a hybrid computing environment may include a host computer (110 on FIG. 2) having a host computer architecture and an accelerator (104 on FIG. 2) having an accelerator architecture, the accelerator architecture optimized, with respect to the host computer architecture, for speed of execution of a particular class of computing functions, the host computer (110 on FIG. 2) and the accelerator (104 on FIG. 2) adapted to one another for data communications by an SLMPM (146 on FIG. 2). Although not required in all embodiments of the present invention, the host computer (110 on FIG. 2) and the accelerator (104 on FIG. 2) in a hybrid computing environment in which the method of FIG. 5 may be carried out may also be adapted to one another by two or more data communications fabrics (128, 130 on FIG. 2) of at least two different fabric types.

The method of FIG. 5 includes receiving (502), by the system level message passing module (146) from a host application program (166) on the host computer, operating information (202) for the accelerator application program. In the method of FIG. 5, the operating information (202) includes application execution parameters (204), environment variables (206), and a value (208) of a substitution variable identifying a current working directory ('CWD') for the accelerator application program. The CWD is represented in the execution parameters (204) and in the environment variables (206) by the value (208) of the substitution variable. Receiving (502) operating information (202) for the accelerator application program, may be carried out by receiving, from a host application program through an API, a function call to an SLMPM function with parameters that identify operating information.

The method of FIG. 5 also includes designating (504), by the system level message passing module (146), a directory as a CWD (218) for the accelerator application program, separate from any other CWDs of any other applications running on the accelerator. Designating (504) a directory as a CWD (218) for the accelerator application program, separate from any other CWDs of any other applications running on the accelerator may be carried out by creating a directory using a Unix-type 'mkdir' system command that creates a directory with a user-specified path.

The method of FIG. 5 also includes assigning (506), by the system level message passing module (146) to the CWD (218), a name (508) that is unique with respect to names of other CWDs of other applications in the computing environment. Assigning (506) a name (508) that is unique with respect to names of other CWDs of other applications in the computing environment to the CWD (218) may be carried out by forking into a new process and executing a Unix-type 'chdir' command, changing the current CWD of the new process to another CWD.

The method of FIG. 5 also includes starting (510), by the system level message passing module (146), the accelerator application program on the accelerator. Starting (510) the accelerator application program on the accelerator may be carried out by executing a Unix-type 'fork' system command, where the forked process calls a Unix-type 'exec' system command, using as an argument to the exec command the name of the executable file of the accelerator application program stored in the CWD.

Figure 6:
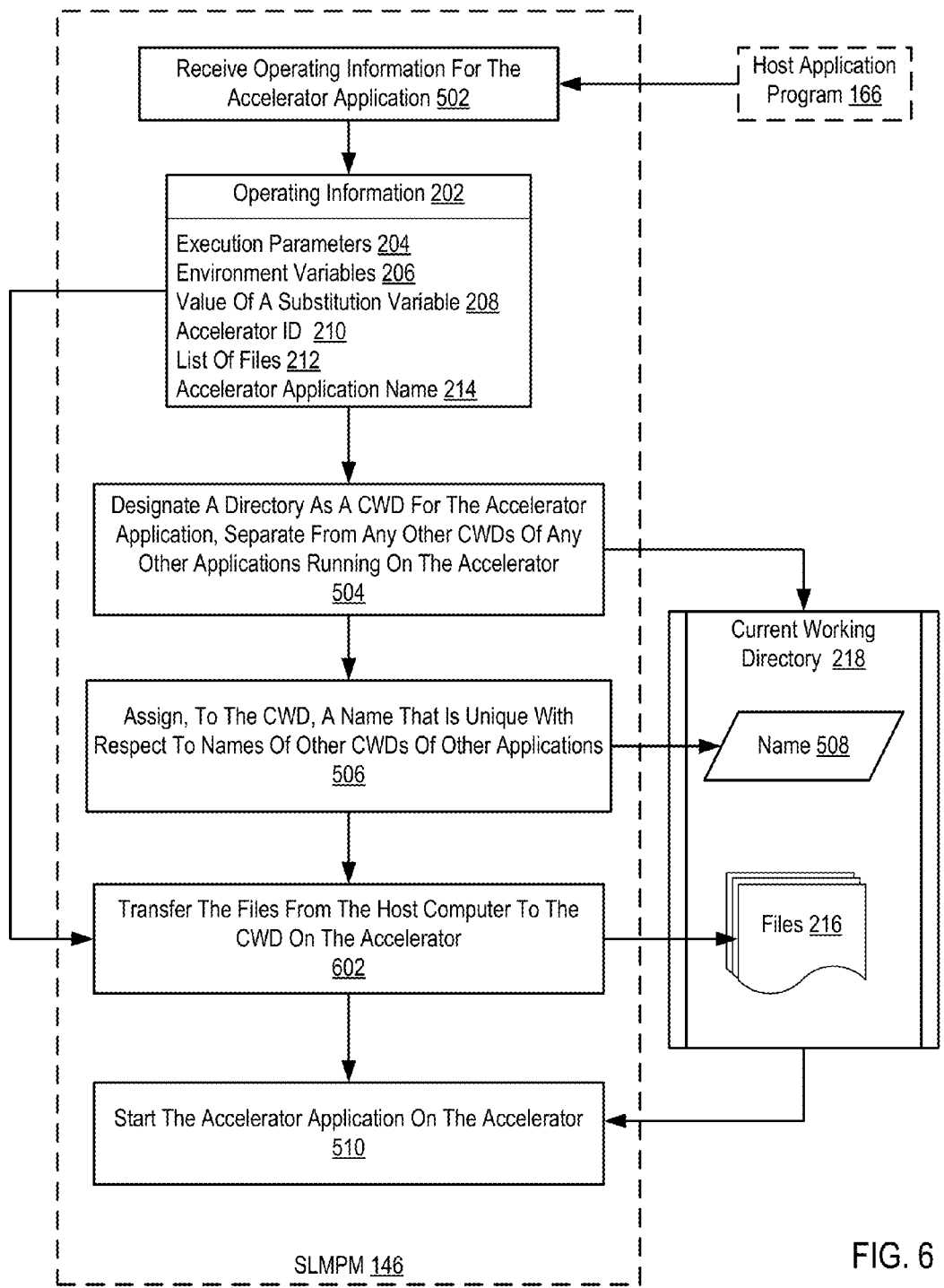
FIG. 6 sets forth a flow chart illustrating a further exemplary method for executing an accelerator application program on an accelerator in a hybrid computing environment according to embodiments of the present invention.

For further explanation, FIG. 6 sets forth a flow chart illustrating a further exemplary method for executing an accelerator application program on an accelerator in a hybrid computing environment according to embodiments of the present invention. The method of FIG. 6, like the method of FIG. 5 is carried out in a hybrid computing environment similar to the hybrid computing environments described above in this specification. Such a hybrid computing environment includes a host computer (110 on FIG. 2) having a host computer architecture and an accelerator (104 on FIG. 2) having an accelerator architecture, the accelerator architecture optimized, with respect to the host computer architecture, for speed of execution of a particular class of computing functions, the host computer (110 on FIG. 2) and the accelerator (104 on FIG. 2) adapted to one another for data communications by a system level message passing module (146 on FIG. 2) and, optionally, by two or more data communications fabrics (128, 130 on FIG. 2) of at least two different fabric types. The method of FIG. 6 is similar to the method of FIG. 5 including, as it does, the system level message passing module's receiving (502), from a host application program (166), operating information (202); designating (504) a directory as a CWD for an accelerator application program; assigning, to the CWD, a name; and starting the accelerator application program on an accelerator. The method of FIG. 6 differs from the method of FIG. 5, however, in that in the method of FIG. 6, the operating information (202) also includes the identity (210) of an accelerator, a list (212) of files to transfer to the accelerator, and the name (214) of the accelerator application program. The method of FIG. 6 also differs from the method of FIG. 5 in that the method of FIG. 6 includes transferring (602), by the system level message passing module, the files (216) from the host computer to the CWD (218) on the accelerator.

Figure 7:
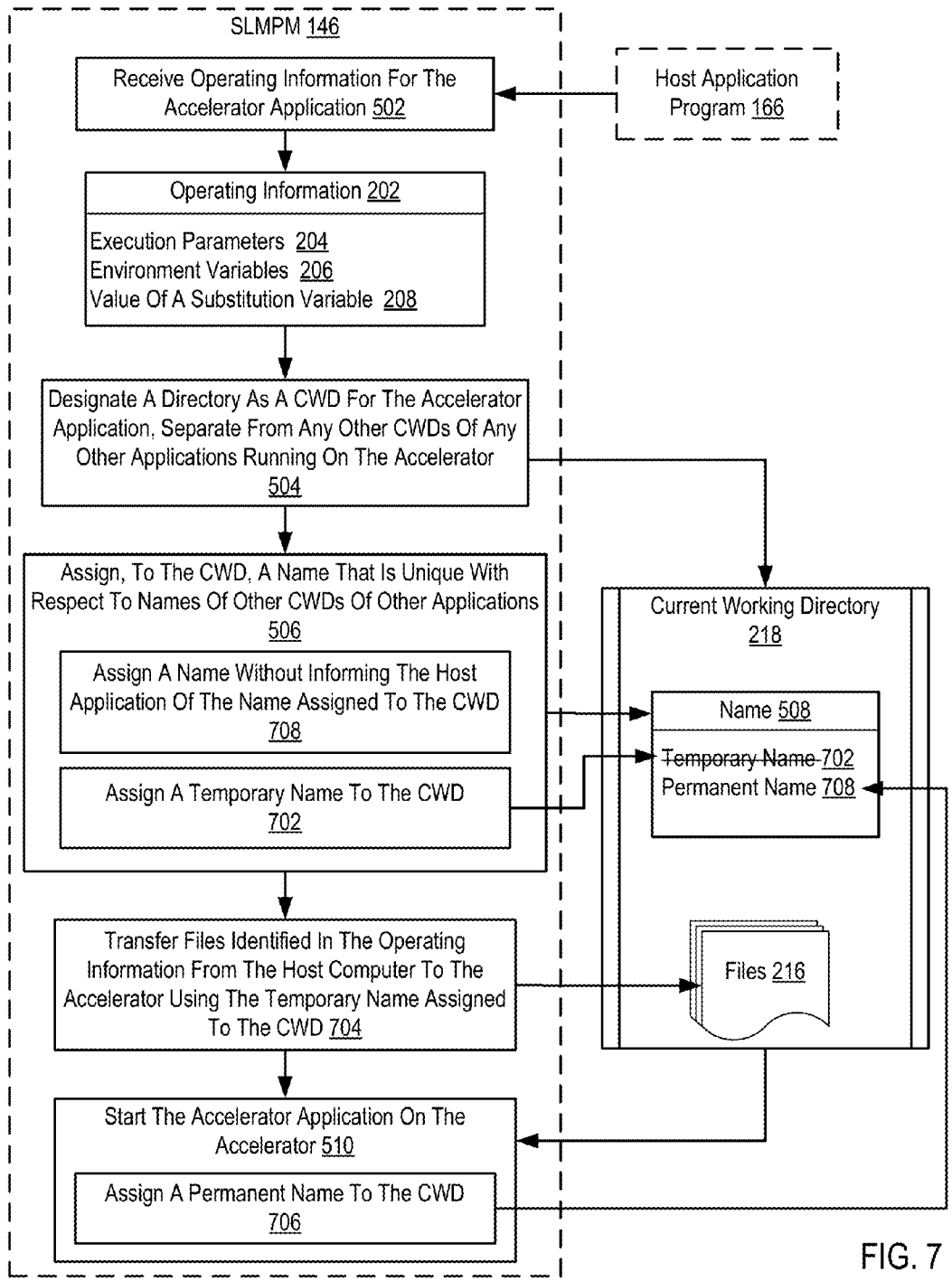
FIG. 7 sets forth a flow chart illustrating a further exemplary method for executing an accelerator application program on an accelerator in a hybrid computing environment according to embodiments of the present invention.

For further explanation, FIG. 7 sets forth a flow chart illustrating a further exemplary method for executing an accelerator application program on an accelerator in a hybrid computing environment according to embodiments of the present invention. The method of FIG. 7, like the method of FIG. 5 is carried out in a hybrid computing environment similar to the hybrid computing environments described above in this specification. Such a hybrid computing environment includes a host computer (110 on FIG. 2) having a host computer architecture and an accelerator (104 on FIG. 2) having an accelerator architecture, the accelerator architecture optimized, with respect to the host computer architecture, for speed of execution of a particular class of computing functions, the host computer (110 on FIG. 2) and the accelerator (104 on FIG. 2) adapted to one another for data communications by a system level message passing module (146 on FIG. 2) and, optionally, by two or more data communications fabrics (128, 130 on FIG. 2) of at least two different fabric types. The method of FIG. 7 is similar to the method of FIG. 5 including, as it does, the system level message passing module's receiving (502), from a host application program (166), operating information (202); designating (504) a directory as a CWD for an accelerator application program; assigning, to the CWD, a name; and starting the accelerator application program on an accelerator. The method of FIG. 7 differs from the method of FIG. 5, however, in that in the method of FIG. 7, assigning (506) a name (508) to the CWD (218) that is unique with respect to names of other CWDs of other applications in the computing environment includes assigning (708) the name without informing the host application program (166) of the name (508) assigned to the CWD. The method of FIG. 7 also differs from the method of FIG. 5 in that, in the method of FIG. 7, assigning (506) a name (508) to the CWD (218) that is unique with respect to names of other CWDs of other applications in the computing environment includes also includes assigning (702) a temporary name (702) to the CWD (218), the method of FIG. 7 includes transferring (704), by the system level message passing module (146), files (216) identified in the operating information (218) from the host computer to the accelerator using the temporary name (702) assigned to the CWD, and starting (510) the accelerator application program on the accelerator in the method of FIG. 7 includes assigning (706) a permanent name (708) to the CWD. Assigning (706) a permanent name (708) to the CWD includes replacing the temporary name illustrated in the method of FIG. 7 with a strikethrough of the temporary name (708), with the permanent name (708).

Figure 8:
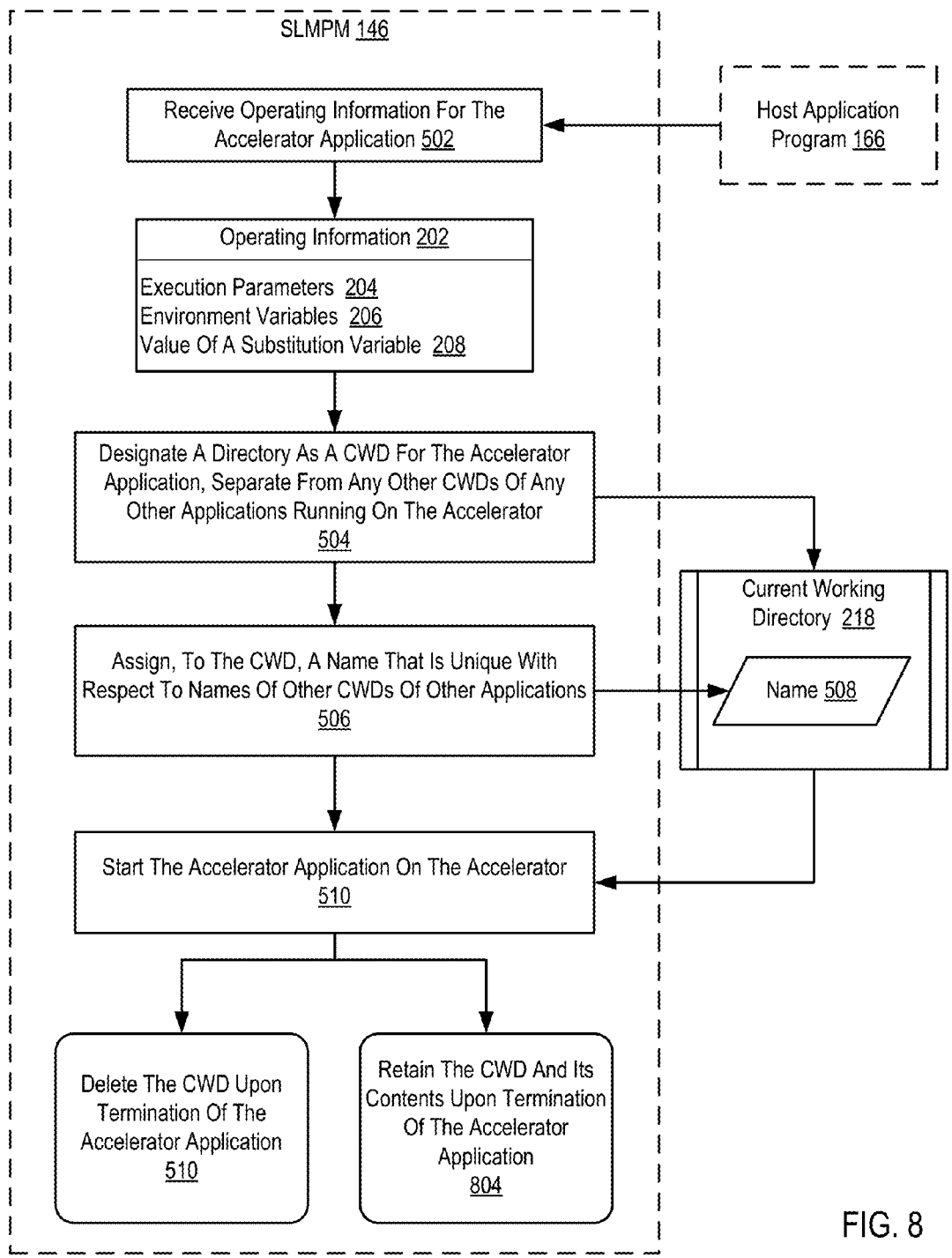
FIG. 8 sets forth a flow chart illustrating a further exemplary method for executing an accelerator application program on an accelerator in a hybrid computing environment according to embodiments of the present invention.

For further explanation, FIG. 8 sets forth a flow chart illustrating a further exemplary method for executing an accelerator application program on an accelerator in a hybrid computing environment according to embodiments of the present invention. The method of FIG. 8, like the method of FIG. 5 is carried out in a hybrid computing environment similar to the hybrid computing environments described above in this specification. Such a hybrid computing environment includes a host computer (110 on FIG. 2) having a host computer architecture and an accelerator (104 on FIG. 2) having an accelerator architecture, the accelerator architecture optimized, with respect to the host computer architecture, for speed of execution of a particular class of computing functions, the host computer (110 on FIG. 2) and the accelerator (104 on FIG. 2) adapted to one another for data communications by a system level message passing module (146 on FIG. 2) and, optionally, by two or more data communications fabrics (128, 130 on FIG. 2) of at least two different fabric types. The method of FIG. 8 is similar to the method of FIG. 5 including, as it does, the system level message passing module's receiving (502), from a host application program (166), operating information (202); designating (504) a directory as a CWD for an accelerator application program; assigning, to the CWD, a name; and starting the accelerator application program on an accelerator. The method of FIG. 8 differs from the method of FIG. 5, however, in that the method of FIG. 8 includes two alternative actions which the SLMPM may take upon termination of the accelerator application program: deleting (510) the CWD (218) or retaining (804) the CWD (218) and its contents, such as files transferred from the host computer to the accelerator, data stored in the directory upon during execution of the accelerator application program and the like.

Figure 9:
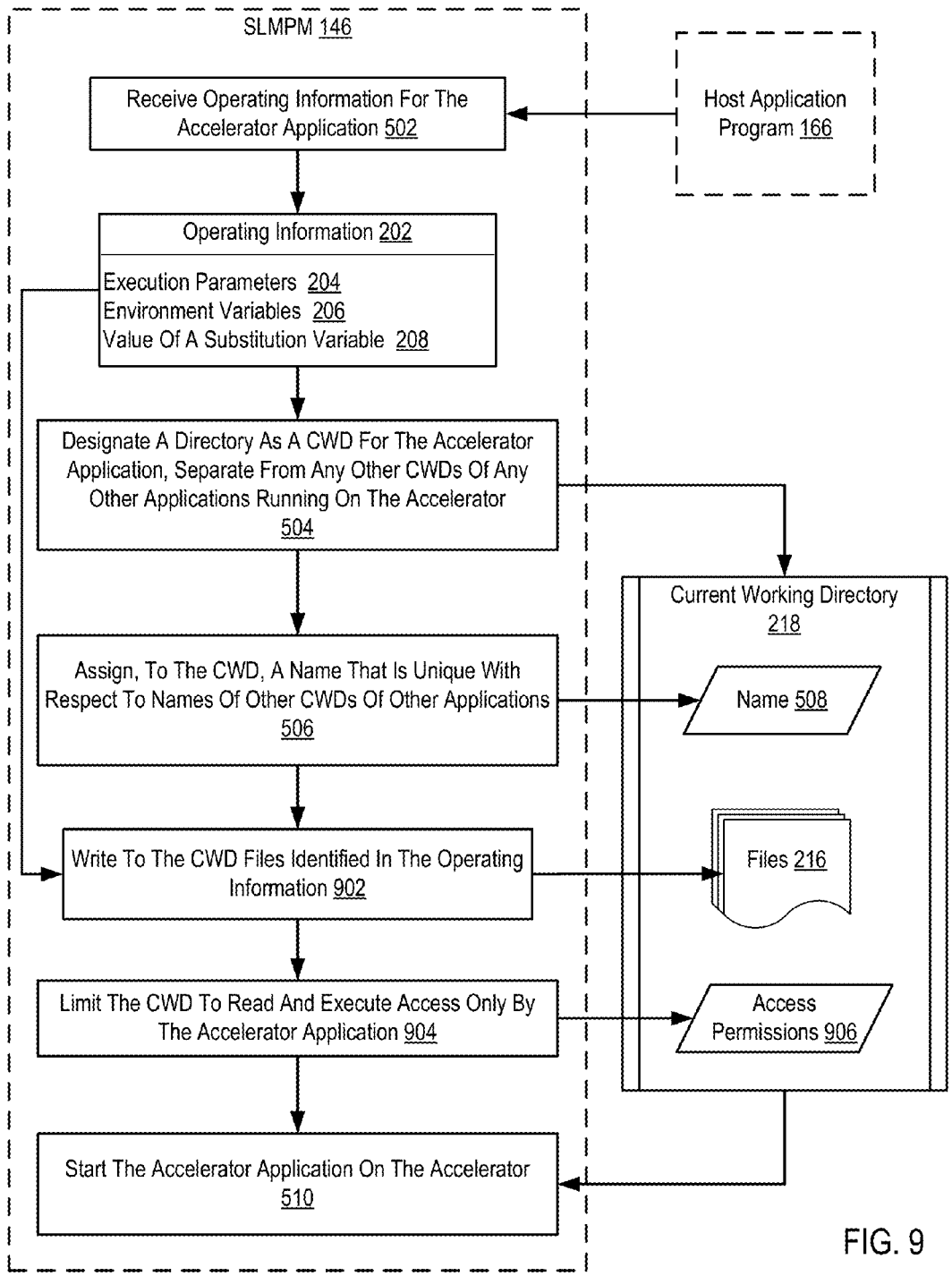
FIG. 9 sets forth a flow chart illustrating a further exemplary method for executing an accelerator application program on an accelerator in a hybrid computing environment according to embodiments of the present invention.

For further explanation, FIG. 9 sets forth a flow chart illustrating a further exemplary method for executing an accelerator application program on an accelerator in a hybrid computing environment according to embodiments of the present invention. The method of FIG. 9, like the method of FIG. 5 is carried out in a hybrid computing environment similar to the hybrid computing environments described above in this specification. Such a hybrid computing environment includes a host computer (110 on FIG. 2) having a host computer architecture and an accelerator (104 on FIG. 2) having an accelerator architecture, the accelerator architecture optimized, with respect to the host computer architecture, for speed of execution of a particular class of computing functions, the host computer (110 on FIG. 2) and the accelerator (104 on FIG. 2) adapted to one another for data communications by a system level message passing module (146 on FIG. 2) and, optionally, by two or more data communications fabrics (128, 130 on FIG. 2) of at least two different fabric types. The method of FIG. 9 is similar to the method of FIG. 5 including, as it does, the system level message passing module's receiving (502), from a host application program (166), operating information (202); designating (504) a directory as a CWD for an accelerator application program; assigning, to the CWD, a name; and starting the accelerator application program on an accelerator. The method of FIG. 9 differs from the method of FIG. 5, however, in that the method of FIG. 9 includes writing (902) to the CWD (218) files (216) identified in the operating information (202) as files to transfer from the host computer to the accelerator and limiting (904) the CWD (904) to read and execute access only by the accelerator application program. Limiting (904) the CWD (904) to read and execute access only by the accelerator application program may be carried out by executing a Unix-type 'chmod' command to change access permissions (906) of the directory.

Figure 10:
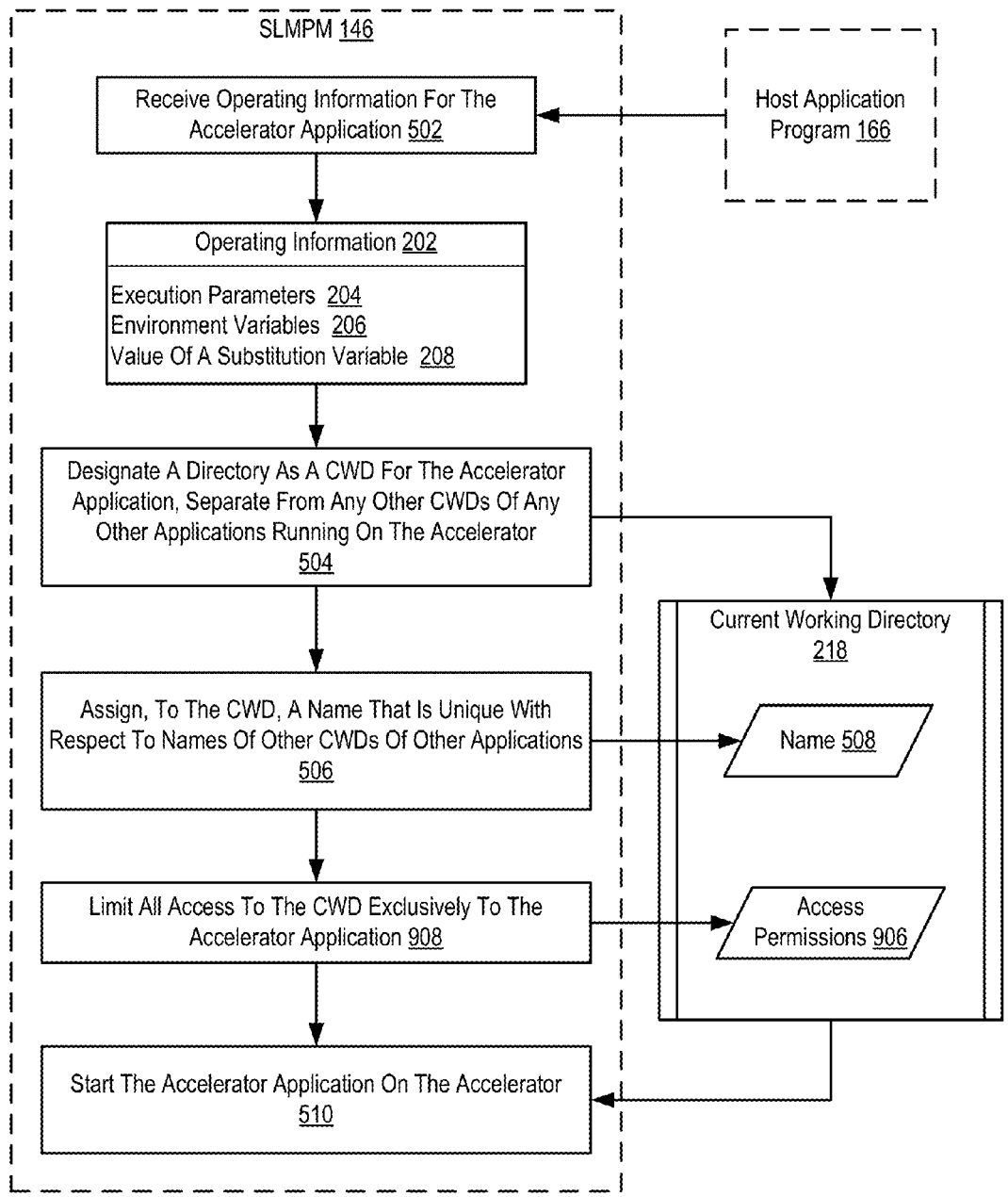
FIG. 10 sets forth a flow chart illustrating a further exemplary method for executing an accelerator application program on an accelerator in a hybrid computing environment according to embodiments of the present invention.

For further explanation, FIG. 10 sets forth a flow chart illustrating a further exemplary method for executing an accelerator application program on an accelerator in a hybrid computing environment according to embodiments of the present invention. The method of FIG. 10, like the method of FIG. 5 is carried out in a hybrid computing environment similar to the hybrid computing environments described above in this specification. Such a hybrid computing environment includes a host computer (110 on FIG. 2) having a host computer architecture and an accelerator (104 on FIG. 2) having an accelerator architecture, the accelerator architecture optimized, with respect to the host computer architecture, for speed of execution of a particular class of computing functions, the host computer (110 on FIG. 2) and the accelerator (104 on FIG. 2) adapted to one another for data communications by a system level message passing module (146 on FIG. 2) and, optionally, by two or more data communications fabrics (128, 130 on FIG. 2) of at least two different fabric types. The method of FIG. 10 is similar to the method of FIG. 5 including, as it does, the system level message passing module's receiving (502), from a host application program (166), operating information (202); designating (504) a directory as a CWD for an accelerator application program; assigning, to the CWD, a name; and starting the accelerator application program on an accelerator. The method of FIG. 10 differs from the method of FIG. 5, however, in that the method of FIG. 10 includes limiting (908), by the system level message passing module (146), all access to the CWD (218) exclusively to the accelerator application program. Limiting (908) all access to the CWD (218) exclusively to the accelerator application program may be carried out by executing a Unix-type 'chmod' command to change access permissions (906) of the directory.

Exemplary embodiments of the present invention are described largely in the context of data processing in a fully functional hybrid computing environment. Readers of skill in the art will recognize, however, that method aspects of the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of executing an accelerator application program on an accelerator in a hybrid computing environment, the hybrid computing environment comprising:

a host computer and an accelerator, the host computer and the accelerator adapted to one another for data communications by a system level message passing module;

the method comprising:

receiving, by the system level message passing module from a host application program on the host computer, operating information for the accelerator application program, the operating information including a value of a substitution variable identifying a current working directory ('CWD') for the accelerator application program;

designating, by the system level message passing module, a directory as a CWD for the accelerator application program, separate from any other CWDs of any other applications running on the accelerator;

assigning, by the system level message passing module to the CWD, a name that is unique with respect to names of other CWDs of other applications in the computing environment.

2. The method of claim 1 wherein:

the operating information further comprises the identity of the accelerator, a list of files to transfer to the accelerator, and the name of the accelerator application program; and the method further comprises transferring, by the system level message passing module, the files from the host computer to the CWD on the accelerator.

3. The method of claim 1 wherein:

assigning a name to the CWD that is unique with respect to names of other CWDs of other applications in the computing environment further comprises assigning a temporary name to the CWD;

the method includes transferring, by the system level message passing module, files identified in the operating information from the host computer to the accelerator using the temporary name assigned to the CWD.

4. The method of claim 1 further comprising deleting, by the system level message passing module, the CWD upon termination of the accelerator application program.

5. The method of claim 1 further comprising retaining, by the system level message passing module, the CWD and its contents upon termination of the accelerator application program.

6. The method of claim 1 further comprising:

writing to the CWD, by the system level message passing module, files identified in the operating information as files to transfer from the host computer to the accelerator; and limiting, by the system level message passing module, the CWD to read and execute access only by the accelerator application program.

7. The method of claim 1 further comprising limiting, by the system level message passing module, all access to the CWD exclusively to the accelerator application program.

8. The method of claim 1 wherein assigning a name to the CWD further comprises assigning the name without informing the host application program of the name assigned to the CWD.

9. A hybrid computing environment for executing an accelerator application program on an accelerator, the hybrid computing environment comprising:

a host computer and an accelerator, the host computer and the accelerator adapted to one another for data communications by a system level message passing module;

the system level message passing module comprising computer program instructions capable of:

receiving, by the system level message passing module from a host application program on the host computer, operating information for the accelerator application program, the operating information including a value of a substitution variable identifying a current working directory ('CWD') for the accelerator application program;

designating, by the system level message passing module, a directory as a CWD for the accelerator application program, separate from any other CWDs of any other applications running on the accelerator;

assigning, by the system level message passing module to the CWD, a name that is unique with respect to names of other CWDs of other applications in the computing environment.

10. The hybrid computing environment of claim 9 wherein:

the operating information further comprises the identity of the accelerator, a list of files to transfer to the accelerator, and the name of the accelerator application program; and the hybrid computing environment further comprises computer program instructions capable of transferring, by the system level message passing module, the files from the host computer to the CWD on the accelerator.

11. The hybrid computing environment of claim 9 wherein:

assigning a name to the CWD that is unique with respect to names of other CWDs of other applications in the computing environment further comprises assigning a temporary name to the CWD;

the hybrid computing environment further comprises computer program instructions capable of transferring, by the system level message passing module, files identified in the operating information from the host computer to the accelerator using the temporary name assigned to the CWD.

12. The hybrid computing environment of claim 9 further comprising computer program instructions capable of deleting, by the system level message passing module, the CWD upon termination of the accelerator application program.

13. The hybrid computing environment of claim 9 further comprising computer program instructions capable of retaining, by the system level message passing module, the CWD and its contents upon termination of the accelerator application program.

14. The hybrid computing environment of claim 9 further comprising computer program instructions capable of:

writing to the CWD, by the system level message passing module, files identified in the operating information as files to transfer from the host computer to the accelerator; and limiting, by the system level message passing module, the CWD to read and execute access only by the accelerator application program.

15. The hybrid computing environment of claim 9 further comprising computer program instructions capable of limiting, by the system level message passing module, all access to the CWD exclusively to the accelerator application program.

16. The hybrid computing environment of claim 9 wherein assigning a name to the CWD further comprises assigning the name without informing the host application program of the name assigned to the CWD.

17. A computer program product for executing an accelerator application program on an accelerator in a hybrid computing environment, the hybrid computing environment comprising:

a host computer and an accelerator, the host computer and the accelerator adapted to one another for data communications by a system level message passing module;

the computer program product disposed upon a computer readable non-transmission medium, the computer program product comprising computer program instructions capable of:

receiving, by the system level message passing module from a host application program on the host computer, operating information for the accelerator application program, the operating information including a value of a substitution variable identifying a current working directory ('CWD') for the accelerator application program;

designating, by the system level message passing module, a directory as a CWD for the accelerator application program, separate from any other CWDs of any other applications running on the accelerator;

assigning, by the system level message passing module to the CWD, a name that is unique with respect to names of other CWDs of other applications in the computing environment.

18. The computer program product of claim 17 wherein:
the operating information further comprises the identity of the accelerator, a list of files to transfer to the accelerator, and the name of the accelerator application program; and
the computer program product further comprises computer program instructions capable of transferring, by the system level message passing module, the files from the host computer to the CWD on the accelerator.

19. The computer program product of claim 17 wherein:
assigning a name to the CWD that is unique with respect to names of other CWDs of other applications in the computing environment further comprises assigning a temporary name to the CWD;
the computer program product further comprises computer program instructions capable of transferring, by the system level message passing module, files identified in the operating information from the host computer to the accelerator using the temporary name assigned to the CWD.

20. The computer program product of claim 17 further comprising computer program instructions capable of deleting, by the system level message passing module, the CWD upon termination of the accelerator application program.

21. The computer program product of claim 17 further comprising computer program instructions capable of retaining, by the system level message passing module, the CWD and its contents upon termination of the accelerator application program.

22. The computer program product of claim 17 further comprising computer program instructions capable of:
writing to the CWD, by the system level message passing module, files identified in the operating information as files to transfer from the host computer to the accelerator; and
limiting, by the system level message passing module, the CWD to read and execute access only by the accelerator application program.

23. The computer program product of claim 17 further comprising computer program instructions capable of limiting, by the system level message passing module, all access to the CWD exclusively to the accelerator application program.

24. The computer program product of claim 17 wherein assigning a name to the CWD further comprises assigning the name without informing the host application program of the name assigned to the CWD.

\* \* \* \* \*